United States Patent
Kataoka et al.

(10) Patent No.: US 10,981,596 B2
(45) Date of Patent: Apr. 20, 2021

(54) STEERING CONTROLLER

(71) Applicant: JTEKT CORPORATION, Osaka (JP)

(72) Inventors: Nobuaki Kataoka, Okazaki (JP); Shingo Maeda, Okazaki (JP); Jun Hasegawa, Okazaki (JP); Masayuki Kita, Okazaki (JP); Takahiro Toko, Takahama (JP)

(73) Assignee: JTEKT CORPORATION, Osaka (JP)

( * ) Notice: Subject to any disclaimer, the term of this patent is extended or adjusted under 35 U.S.C. 154(b) by 215 days.

(21) Appl. No.: 15/989,568

(22) Filed: May 25, 2018

(65) Prior Publication Data

US 2018/0346018 A1    Dec. 6, 2018

(30) Foreign Application Priority Data

May 30, 2017 (JP) .............................. JP2017-107013
Dec. 28, 2017 (JP) .............................. JP2017-254480
Mar. 22, 2018 (JP) .............................. JP2018-054492

(51) Int. Cl.
  *B62D 6/00* (2006.01)
  *B62D 5/04* (2006.01)
  *B62D 15/02* (2006.01)

(52) U.S. Cl.
  CPC ............ *B62D 6/00* (2013.01); *B62D 5/0457* (2013.01); *B62D 5/0463* (2013.01); *B62D 5/0469* (2013.01); *B62D 15/0235* (2013.01); *B62D 15/0245* (2013.01)

(58) Field of Classification Search
  CPC ...... B62D 6/00; B62D 5/0457; B62D 5/0469; B62D 15/0235; B62D 15/0245; B62D 5/0463; B62D 6/003

USPC ........................................................... 701/41
See application file for complete search history.

(56) References Cited

U.S. PATENT DOCUMENTS

2008/0281490 A1* 11/2008 Wittig .................. B62D 5/0457
                                                                    701/41

FOREIGN PATENT DOCUMENTS

DE    10 2004 054 921 A1    5/2006
DE       102004054921 A1 *  5/2006
EP         1 990 255 A2    11/2008
                (Continued)

OTHER PUBLICATIONS

Oct. 25, 2018 extended Search Report issued in European Patent Application No. 18174883.1.

*Primary Examiner* — Maceeh Anwari
(74) *Attorney, Agent, or Firm* — Oliff PLC

(57) ABSTRACT

A control steered angle calculation unit includes: an end position determination unit that determines whether a rack shaft is located at either one of right and left rack end positions; a motor absolute angle calculation unit that detects a motor absolute angle; an end position-corresponding motor angle setting unit that, when the rack shaft is determined to be located at either one of the right and left rack end positions, sets the detected motor absolute angle as an end position-corresponding motor angle corresponding to the one of the right and left rack end positions; and a control steered angle origin setting unit that calculates an average value of right and left end position-corresponding motor angles as an offset angle, and sets an angle obtained by subtracting the offset angle from the detected motor absolute angle as an origin of the control steered angle represented by the motor ab solute angle.

11 Claims, 18 Drawing Sheets

(56) References Cited

FOREIGN PATENT DOCUMENTS

JP   2015-020506 A   2/2015

\* cited by examiner

*FIG. 14*b
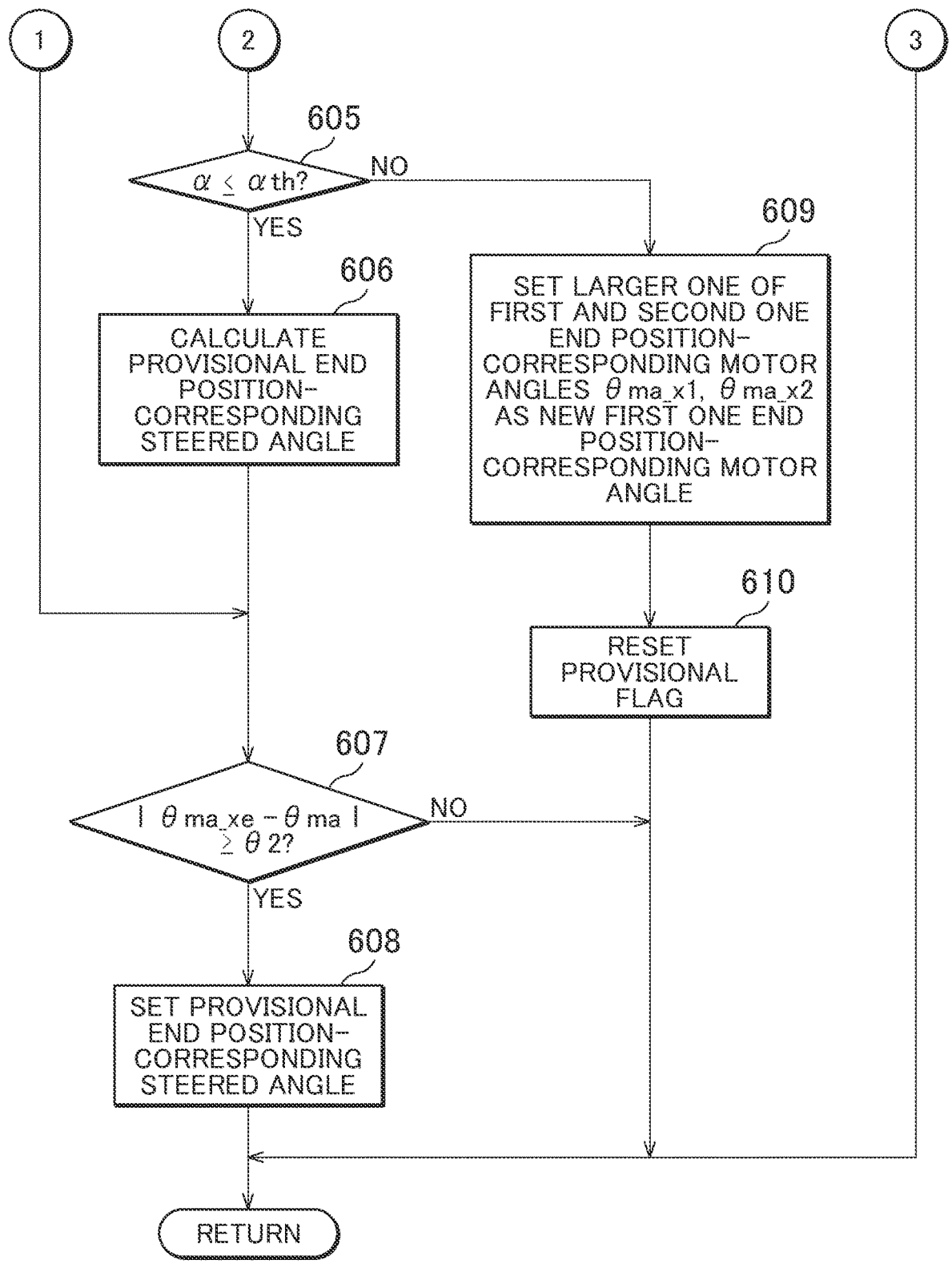

STEERING CONTROLLER

INCORPORATION BY REFERENCE

The disclosure of Japanese Patent Application No. 2017-107013 filed on May 30, 2017, No. 2017-254480 filed on Dec. 28, 2017 and No. 2018-054492 filed on Mar. 22, 2018 including the specification, drawings and abstract, is incorporated herein by reference in its entirety.

BACKGROUND OF THE INVENTION

1. Field of the Invention

The present invention relates to a steering controller.

2. Description of the Related Art

An electric power steering system (EPS) including an actuator having a motor as a driving source is conventionally known as a vehicle steering controller. Some EPSs detect a turned angle of a steering wheel (a steered angle of a steered wheel) in correspondence with a motor rotation angle (motor absolute angle) acquired as an absolute angle in a range exceeding 360 degrees. In this case, the EPS executes various modes of control based on a steered angle for control (control steered angle) represented by a motor absolute angle. An example of control based on a control steered angle is found in Japanese Patent Application Publication No. 2015-20506, for example, which discloses a controller that increases a steering reaction force before a rack end that is an end of a rack shaft hits a rack housing to thereby mitigate the impact of the rack end hitting the rack housing. For example, the control steered angle is detected by summating (counting) the number of rotations of the motor from a reference point (origin) that is an angle of the motor in a state where the rack shaft is located at a steering neutral position.

In the configuration in which the motor absolute angle is detected in correspondence with the steered angle, electric power is continuously supplied from an on-board battery to the controller, for example, even while the ignition is off, to detect rotation of the motor and to maintain the correspondence relationship between the steered angle and the motor absolute angle even when the steered angle changes. However, when electric power supply to the controller is interrupted due to battery replacement etc., rotation of the motor cannot be detected. As a result, the correspondence relationship between the steered angle and the motor absolute angle cannot be maintained, and therefore the motor absolute angle cannot be detected in correspondence with the steered angle. Thus, the creation of a technique has been sought that allows a controller to store (learn) the correspondence relationship between a steered angle and a motor absolute angle so as to be able to acquire an accurate motor absolute angle corresponding to the actual steered angle when this correspondence relationship is lost.

The above problem arises not only in an EPS, but also in a steer-by-wire steering system, for example, when an absolute angle of a motor serving as a driving source for a steering actuator that steers steered wheels is detected in correspondence with a steered angle.

SUMMARY OF THE INVENTION

One object of the present invention is to provide a steering controller that can acquire an accurate motor absolute angle corresponding to an actual steered angle.

A steering controller according to an aspect of the present invention is intended to control a steering system in which an actuator having a motor as a driving source applies a motor torque to a steering axle of a steering mechanism to reciprocate the steering axle. The steering controller is characterized by including: an end position determination unit that determines whether the steering axle is located at either one of right and left end positions; a motor absolute angle detection unit that detects a rotation angle of the motor as an absolute angle exceeding the range of 360 degrees; and an end position-corresponding motor angle setting unit that, when the end position determination unit determines that the steering axle is located at either one of the right and left end positions, sets a motor absolute angle detected by the motor absolute angle detection unit as an end position-corresponding motor angle corresponding to the one of the right and left end positions.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 14a and 14b are flowcharts showing steps of a process of setting a provisional end position-corresponding steered angle;

DETAILED DESCRIPTION OF EMBODIMENTS

Figure 1:
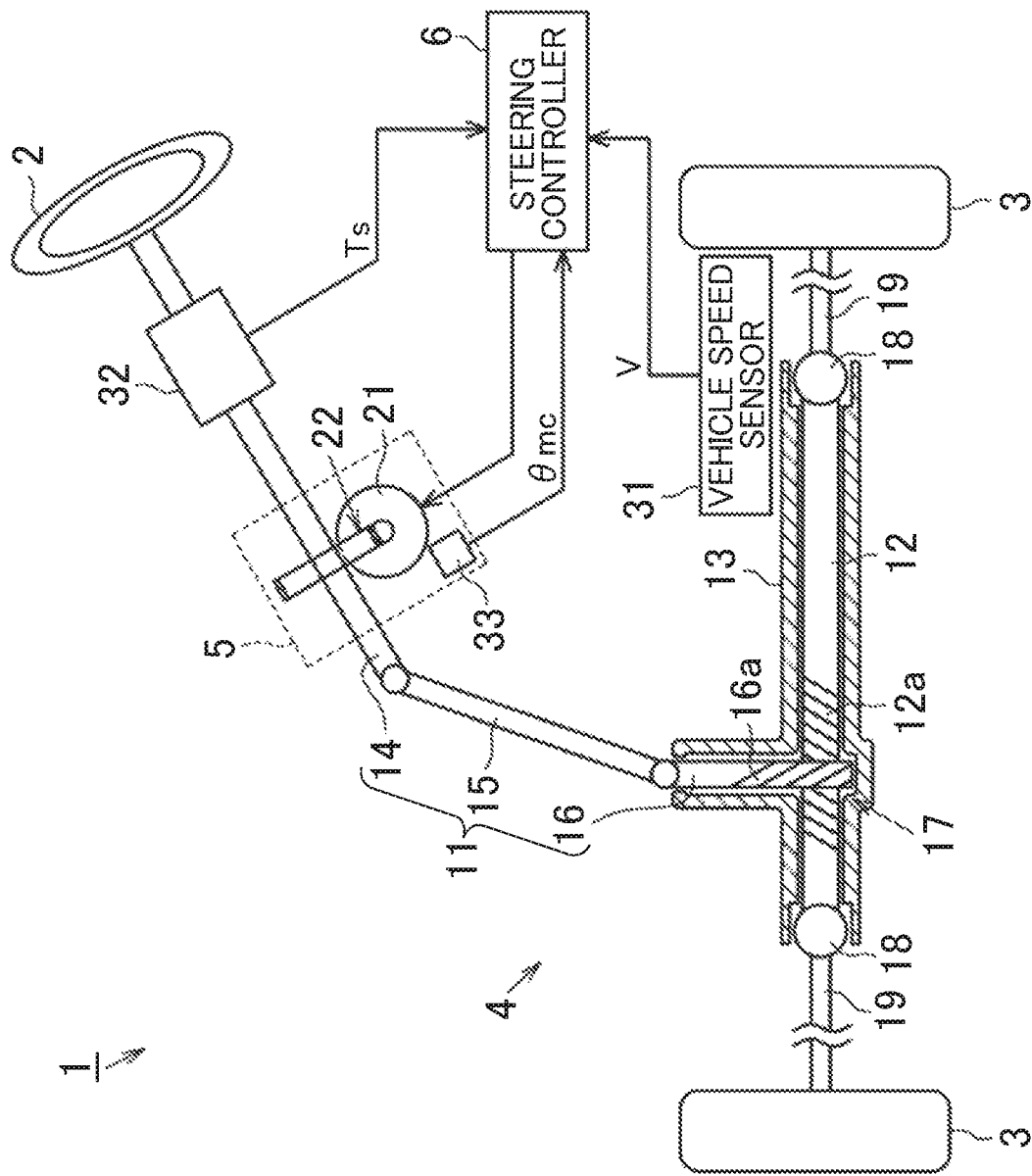
FIG. 1 is a schematic configuration view of an electric power steering system.

A first embodiment of a steering controller will be described below in accordance with the drawings. As shown in FIG. 1, an electric power steering system (EPS) 1 as a steering system to be controlled includes a steering mechanism 4 that steers steered wheels 3 based on operation of a steering wheel 2 performed by a driver. The EPS 1 further includes an EPS actuator 5 and a steering controller 6. The EPS actuator 5 is an actuator that applies an assisting force for assisting steering operation to the steering mechanism 4. The steering controller 6 controls the operation of the EPS actuator 5.

The steering mechanism 4 includes a steering shaft 11, a rack shaft 12, and a substantially cylindrical rack housing 13. The steering wheel 2 is fixed to the steering shaft 11. The rack shaft 12 is a steering axle that reciprocates in an axial direction as the steering shaft 11 rotates. The rack shaft 12 is passed through the rack housing 13 so as to be able to reciprocate. The steering shaft 11 is composed of a column shaft 14, an intermediate shaft 15, and a pinion shaft 16 that are coupled together in the order mentioned from the side of the steering wheel 2.

The rack shaft 12 and the pinion shaft 16 are disposed inside the rack housing 13 so as to form a predetermined intersection angle therebetween. A rack-and-pinion mechanism 17 is formed as rack teeth 12a formed on the rack shaft 12 and pinion teeth 16a formed on the pinion shaft 16 mesh with each other. One tie rod 19 is turnably coupled to each end of the rack shaft 12 through a rack end 18 that is a ball joint provided at the end of the rack shaft 12. A leading end of the tie rod 19 is coupled to a knuckle (not shown) to which the steered wheel 3 is mounted. Thus, in the EPS 1, rotation of the steering shaft 11 resulting from steering operation is converted into an axial movement of the rack shaft 12 by the rack-and-pinion mechanism 17, and this axial movement is transmitted through the tie rods 19 to the knuckles. As a result, the steered angle of the steered wheels 3, i.e., the direction of travel of the vehicle is changed.

A position at which the rack end 18 hits a left end of the rack housing 13 is the farthest position at which rightward steering is possible. This position corresponds to a rack end position as a right-side end position. A position at which the rack end 18 hits a right end of the rack housing 13 is the farthest position at which leftward steering is possible. This position corresponds to a rack end position as a left-side end position.

The EPS actuator 5 includes a motor 21 as a driving source and a speed reduction mechanism 22. The speed reduction mechanism 22 is a worm-and-wheel set or the like that is coupled to both the motor 21 and the column shaft 14. The EPS actuator 5 transmits rotation of the motor 21 to the column shaft 14 after reducing the speed of the rotation by the speed reduction mechanism 22. Thus, a motor torque Tm is applied to the steering mechanism 4 as an assisting force. A three-phase brushless motor is adopted as the motor 21 of the present embodiment.

A vehicle speed sensor 31 and a torque sensor 32 are connected to the steering controller 6. The vehicle speed sensor 31 detects a speed V of the vehicle. The torque sensor 32 detects a steering torque Ts applied to the steering shaft 11 by steering of the driver. In addition, a rotation sensor 33 as a motor relative angle detection unit that detects a rotation angle θmc of the motor 21 as a relative angle within the range of 360 degrees is connected to the steering controller 6. The steering torque Ts and the rotation angle θmc are detected as positive values when the driver steers in one direction (in the present embodiment, rightward), and as negative values when the driver steers in the other direction (in the present embodiment, leftward). The steering controller 6 supplies driving electric power to the motor 21 based on signals indicating various state quantities that are input from these sensors and signals indicating state quantities of the motor 21. Thus, the steering controller 6 controls the operation of the EPS actuator 5, i.e., the assisting force applied to the steering mechanism 4.

Figure 2:
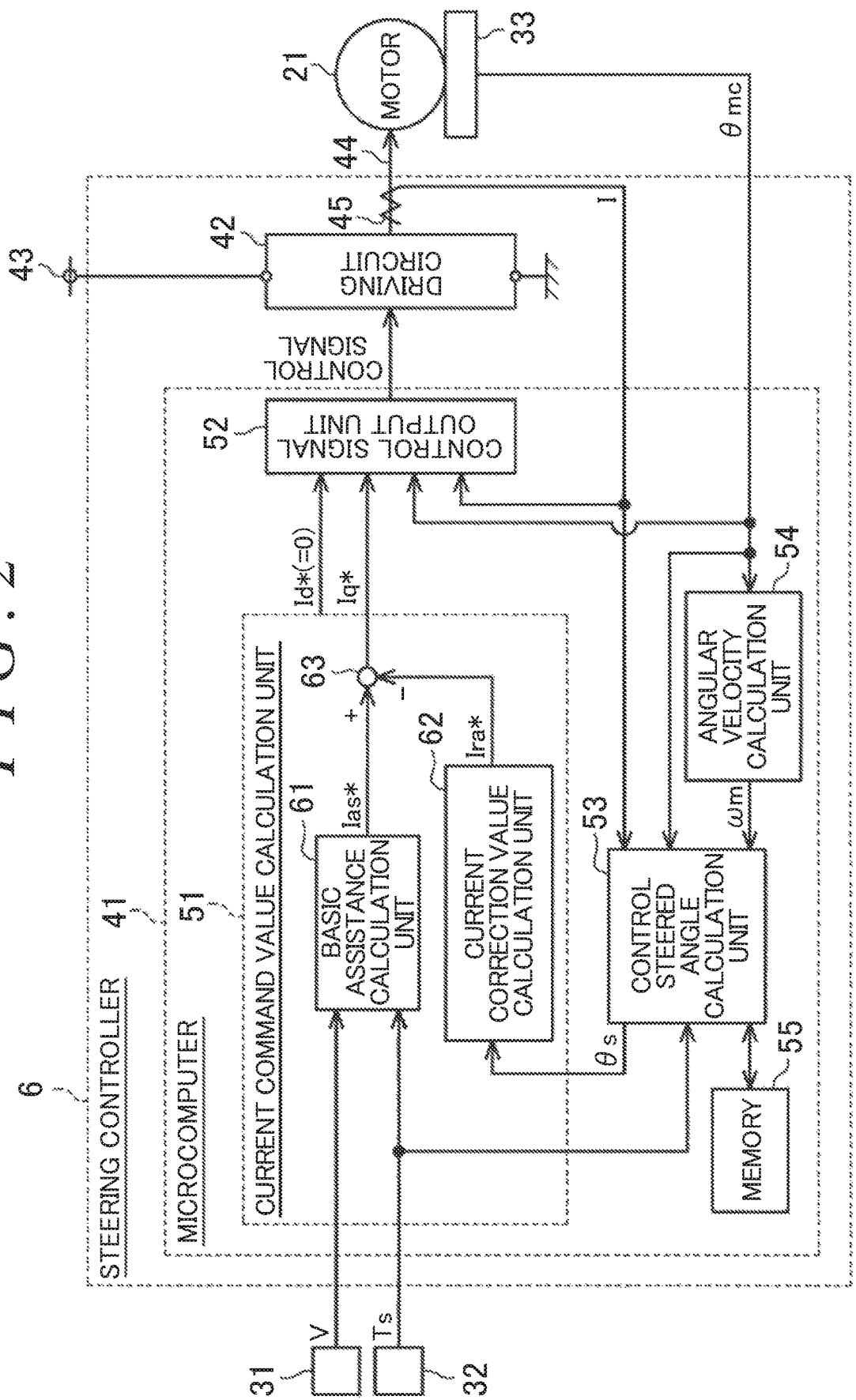
FIG. 2 is a block diagram of a steering controller of a first embodiment.

As shown in FIG. 2, the steering controller 6 includes a microcomputer 41 and a driving circuit 42. The microcomputer 41 is a motor control unit that outputs a control signal. The driving circuit 42 supplies driving electric power to the motor 21 based on the control signal. A publicly known Pulse Width Modulation (PWM) inverter having a plurality of switching elements (e.g., Field Effect Transistors (FETs)) is adopted as the driving circuit 42 in the present embodiment. The control signal output by the microcomputer 41 specifies the on-off state of each switching element. Thus, each switching element turns on or off in response to the control signal, thereby switching the pattern of application of a current to motor coils of different phases. As a result, direct-current electric power of a battery 43 is converted into three-phase driving electric power and output to the motor 21. Control blocks to be presented below are realized by a computer program executed by the microcomputer 41. The microcomputer 41 detects various state quantities in predetermined sampling cycles (detection cycles), and in each predetermined calculation cycle executes calculation processes to be presented below with the respective control blocks.

The vehicle speed V, the steering torque Ts, and the rotation angle θmc of the motor 21 are input into the microcomputer 41. In addition, phase current values I of the motor 21 detected by current sensors 45 respectively provided on connection lines 44 between the driving circuit 42 and the motor coils of different phases are input into the microcomputer 41. In FIG. 2, for the convenience of description, the connection lines and the current sensors 45 for these different phases are collectively depicted as one connection line and one current sensor 45. The microcomputer 41 outputs a control signal based on these state quantities.

Specifically, the microcomputer 41 includes a current command value calculation unit 51 and a control signal output unit 52. The current command value calculation unit 51 calculates current command values Id*, Iq* corresponding to a target value of electric power supply to the motor 21, i.e., a target assisting force. The control signal output unit 52 outputs a control signal based on the current command values Id*, Iq*. Based on the rotation angle θmc of the motor 21, the microcomputer 41 summates (counts) the number of rotations of the motor 21 from an origin (zero degree) that is an angle of the motor 21 in a state where the rack shaft 12 is located at a steering neutral position. The microcomputer 41 includes a control steered angle calculation unit 53, an angular velocity calculation unit 54, and a memory 55. The control steered angle calculation unit 53 calculates a control steered angle θs that is represented by an absolute angle in a range exceeding 360°. The angular velocity calculation unit 54 calculates an angular velocity ωm of the motor 21 by differentiating the rotation angle θmc. As with the rotation angle θmc of the motor 21, the control steered angle θs has a positive value when the rotation angle is in one direction from the steering neutral position, and has a negative value when the rotation angle is in the other direction. The current command value is a positive value when steering in one direction is to be assisted, and is a negative value when steering in the other direction is to be assisted.

The current command values Id*, Iq* are target values of a current to be supplied to the motor 21, and respectively represent a current command value on a d-axis and a current command value on a q-axis in a d-q coordinate system. Of these current command values, the q-axis current command value Iq* corresponds to a torque command value that is a target value of an output torque of the motor 21. In the present embodiment, the d-axis current command value Id* is fixed at zero.

Specifically, the current command value calculation unit 51 includes a basic assistance calculation unit 61 and a current correction value calculation unit 62. The basic assistance calculation unit 61 calculates a basic current command value Ias* that is a fundamental component of the q-axis current command value Iq*. The current correction value calculation unit 62 calculates a current correction value Ira* for the basic current command value Ias*. The steering torque Ts and the vehicle speed V are input into the basic assistance calculation unit 61. Based on the steering torque Ts and the vehicle speed V, the basic assistance calculation unit 61 calculates the basic current command value Ias*. In particular, the basic assistance calculation unit 61 calculates the basic current command value Ias* that has a larger value (absolute value) as the absolute value of the steering torque Ts is larger and as the vehicle speed V is lower. The basic current command value Ias* thus calculated is input into a subtractor 63.

Figure 3:
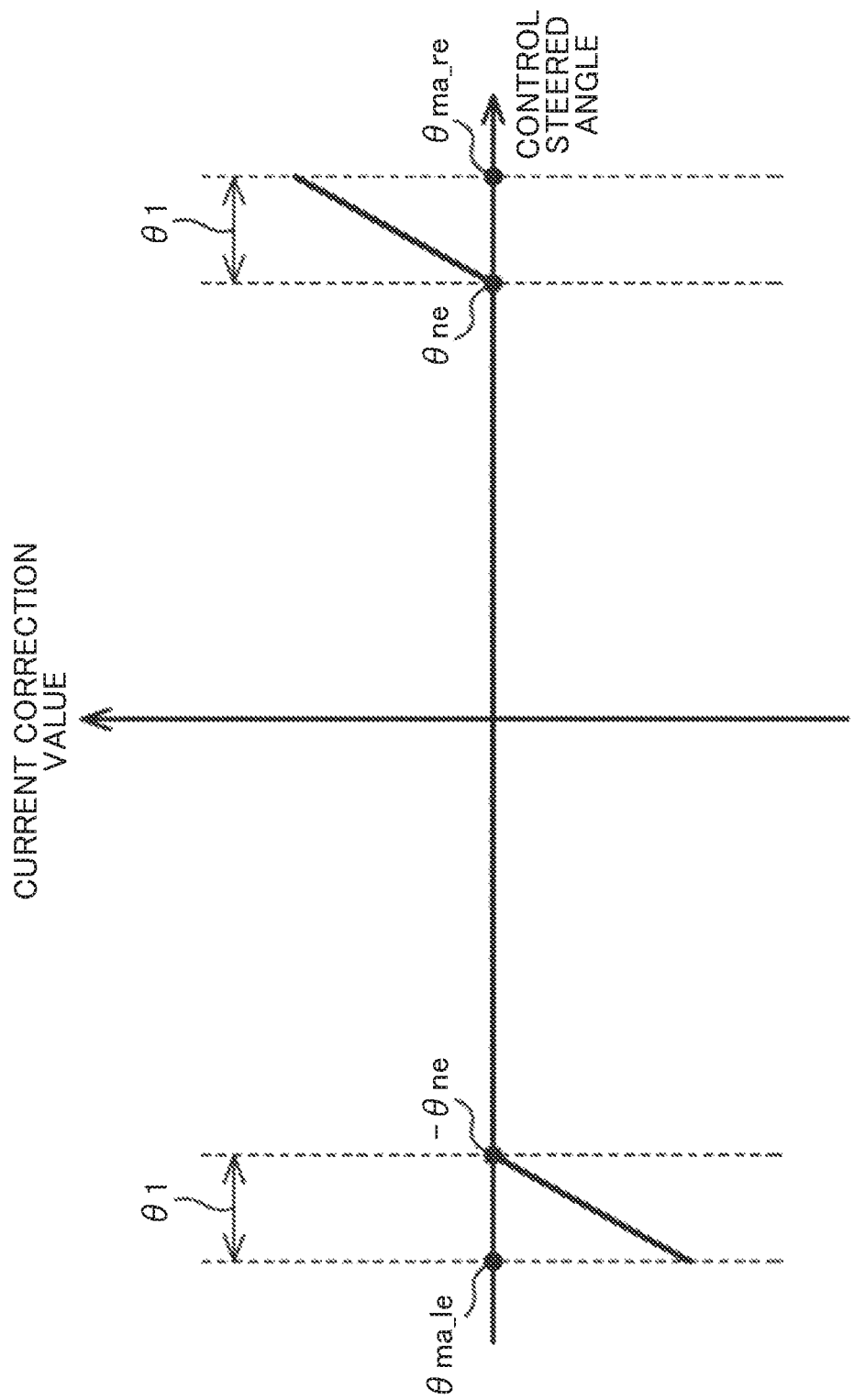
FIG. 3 is a map showing a relationship between a current correction value and a control steered angle in end hitting impact mitigation control.

The current correction value calculation unit 62 calculates the current correction value Ira* based on the control steered angle θs output from the control steered angle calculation unit 53 to be described later. When no control steered angle θs is output from the control steered angle calculation unit 53, the current correction value calculation unit 62 does not calculate the current correction value Ira*, or outputs zero as the current correction value Ira*. The current correction value Ira* is a correction component for correcting the basic current command value Ias* such that a steering reaction force is applied to the steering shaft 11. End hitting impact mitigation control of mitigating the impact of the rack end hitting the rack housing is executed as the current correction value Ira* is output. The current correction value calculation unit 62 has a map as shown in FIG. 3, for example, and calculates the current correction value Ira* from the control steered angle θs based on this map. In this map, near-end steered angles θne are set that indicate angles smaller in the absolute value by a first angle θ1 than the control steered angles θs at the rack end positions (end position-corresponding motor angles θma_re, θma_le) at which the rack ends 18 hit the rack housing 13. The first angle θ1 is set to a relatively small angle such that the near-end steered angle θne is not too far away from the rack end position. In accordance with this map, when the absolute value of the control steered angle θs becomes larger than the absolute value of the near-end steered angle θne, the current correction value calculation unit 62 calculates the current correction value Ira* such that a larger steering reaction force is applied as the absolute value of the control steered angle θs increases. The current correction value Ira* thus calculated is input into the subtractor 63.

The subtractor 63 calculates the q-axis current command value Iq* by subtracting the current correction value Ira* calculated by the current correction value calculation unit 62 from the basic current command value Ias* calculated by the basic assistance calculation unit 61. Then, the subtractor 63 outputs the calculated q-axis current command value Iq* to the control signal output unit 52. Thus, when the absolute value of the control steered angle θs exceeds the absolute value of the near-end steered angle θne, the microcomputer 41 executes end hitting impact mitigation control of reducing the absolute value of the q-axis current command value Iq*, which serves as the torque command value, based on the increase in the absolute value of the control steered angle θs.

The control signal output unit 52 generates a control signal by executing current feedback control in the d-q coordinate system based on the current command values Id*, Iq*, the phase current values I, and the rotation angle θmc of the motor 21. Specifically, the control signal output unit 52 calculates the d-axis current value and the q-axis current value in the d-q coordinate system that are actual current values of the motor 21 by mapping the phase current values I onto d-q coordinates based on the rotation angle θmc. Then, the control signal output unit 52 generates a control signal by executing current feedback control on each of the d-axis current value and the q-axis current value such that the d-axis current value follows the d-axis current command value Id* and that the q-axis current value follows the q-axis current command value Iq*. As this control signal is output to the driving circuit 42, driving electric power according to the control signal is supplied to the motor 21. Thus, driving of the motor 21 is controlled such that the output torque of the motor 21 follows the torque command value corresponding to the q-axis current command value Iq*.

Next, calculation of the control steered angle θs by the control steered angle calculation unit 53 will be described. The steering torque Ts, the rotation angle θmc of the motor 21, the angular velocity ωm, and the phase current values I are input into the control steered angle calculation unit 53. The control steered angle calculation unit 53 calculates the control steered angle θs based on these state quantities. Here, the control steered angle θs is a motor absolute angle θma that is represented by an absolute angle in a range exceeding 360°, and that is obtained by summating the number of rotations of the motor 21 from the origin that is the angle of the motor 21 in the state where the rack shaft 12 is located at the steering neutral position. The control steered angle calculation unit 53 calculates the control steered angle θs (motor absolute angle θma) by counting the number of rotations of the motor 21 from the origin based on the rotation angle θmc of the motor 21. The origin of the control steered angle θs is stored in a memory 55 in correspondence with the steering neutral position of the steering mechanism 4. When electric power supply to the microcomputer 41 is interrupted due to replacement of the battery 43 etc., rotation of the motor 21 cannot be detected. Thus, the correspondence relationship cannot be maintained when the steered angle changes, and the origin of the control steered angle θs held in correspondence with the steered angle of the steering mechanism 4 is lost. Therefore, the control steered angle calculation unit 53 sets the origin of the control steered angle θs when this origin is not set.

To set the origin of the control steered angle θs, first, the control steered angle calculation unit 53 sets the motor absolute angles θma when the rack shaft 12 is located at the right and left rack end positions respectively as the right and left end position-corresponding motor angles θma_re, θma_le. Based on the right and left end position-corresponding motor angles θma_re, θma_le, the control steered angle calculation unit 53 sets the origin of the control steered angle θs. When the origin has already been set, the control steered angle calculation unit 53 calculates the control steered angle θs by counting the number of rotations of the motor 21 from the origin based on the acquired rotation angle θmc of the motor 21, and outputs the control steered angle θs to the current correction value calculation unit 62.

Figure 4:
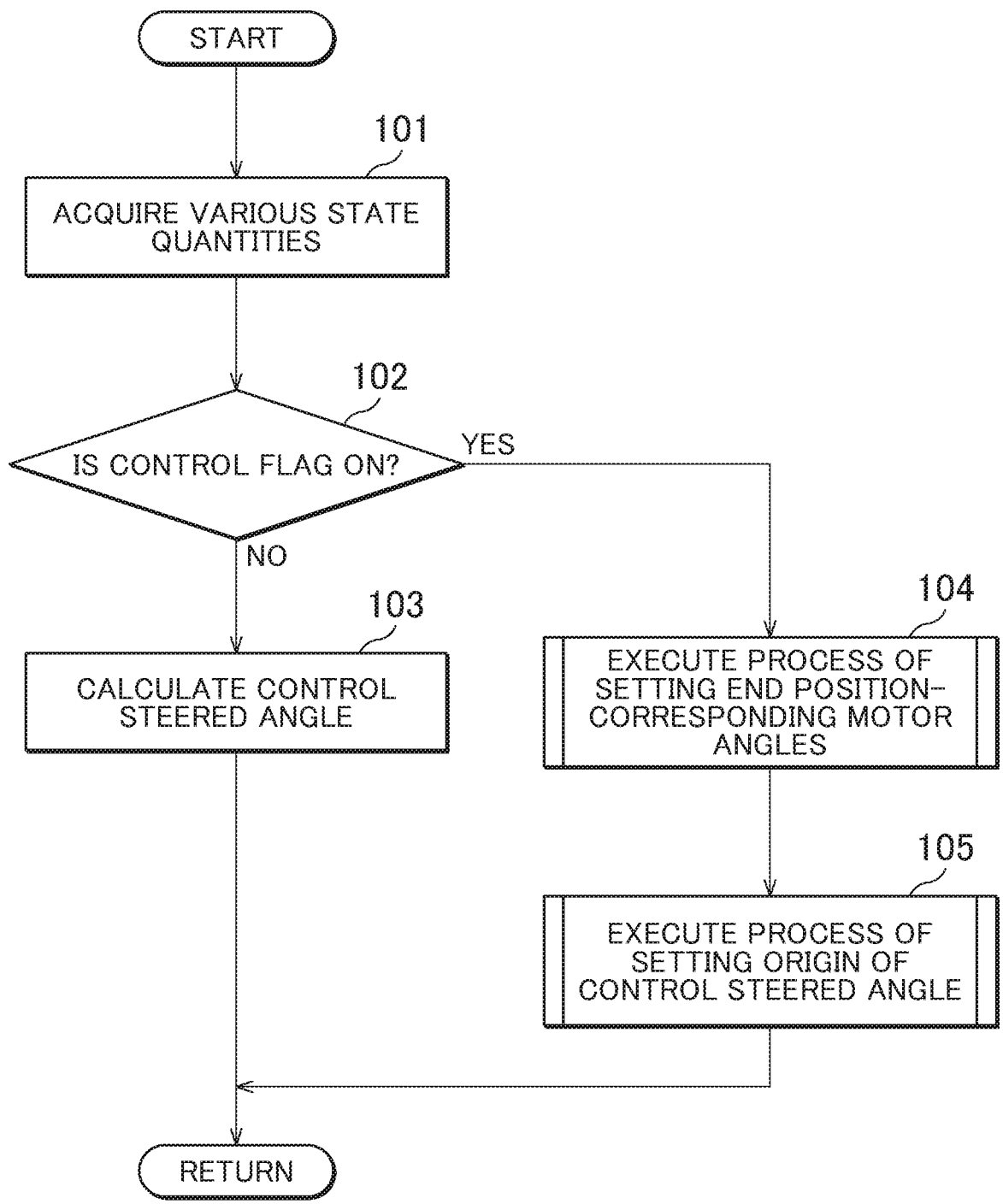
FIG. 4 is a flowchart showing steps of a process executed by a control steered angle calculation unit of the first embodiment.

In particular, as shown in the flowchart of FIG. 4, upon acquiring various state quantities (step 101), the control steered angle calculation unit 53 determines whether a control flag indicating that the origin of the control steered angle θs should be set is on (step 102). This control flag is preset to turn on when electric power supply to the steering controller 6 is resumed after being stopped.

When the control flag is not on (step 102: NO), the control steered angle calculation unit 53 calculates the control steered angle θs, and outputs the control steered angle θs to the current correction value calculation unit 62 (step 103). On the other hand, when the control flag is on (step 102: YES), the control steered angle calculation unit 53 executes the process of setting the right and left end position-corresponding motor angles θma_re, θma_le (step 104), and then executes the process of setting the origin of the control steered angle θs (step 105).

Next, setting of the right and left end position-corresponding motor angles θma_re, θma_le will be described.

Figure 5:
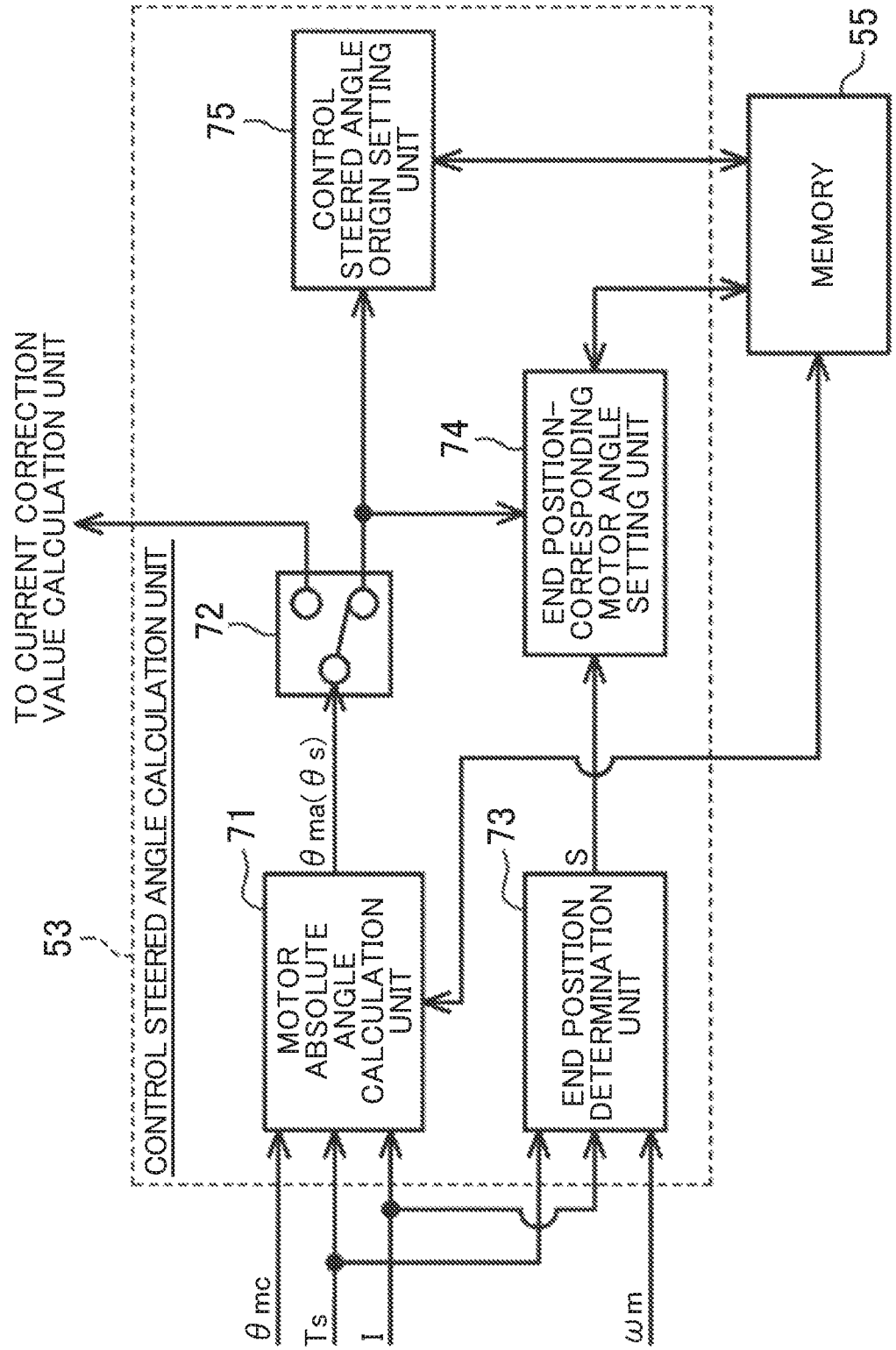
FIG. 5 is a block diagram of the control steered angle calculation unit of the first embodiment.

As shown in FIG. 5, the control steered angle calculation unit 53 includes a motor absolute angle calculation unit 71 as a motor absolute angle detection unit, an output switching unit 72, an end position determination unit 73, an end position-corresponding motor angle setting unit 74, and a control steered angle origin setting unit 75.

The rotation angle θmc of the motor 21, the steering torque Ts, and the phase current values I are input into the motor absolute angle calculation unit 71. The motor absolute angle calculation unit 71 calculates the motor absolute angle θma that is obtained by subtracting mechanical elastic deformation occurring in the steering mechanism 4 from a raw motor absolute angle calculated based on the rotation angle θmc of the motor 21 and the number of rotations thereof from the origin. When the origin of the control steered angle θs is not set in the memory 55, the motor absolute angle calculation unit 71 of the present embodiment stores a rack position at the time of the first electric power supply to the steering controller 6 as a temporary origin, and calculates the motor absolute angle θma by summating the number of rotations from this origin.

Specifically, the motor absolute angle calculation unit 71 calculates a pinion shaft torque Tp that is a sum of the steering torque Ts applied by the driver and the motor torque Tm calculated based on the phase current values I that are actual current values detected by the current sensors 45, i.e., a total value of torque applied to the steering mechanism 4. Then, the motor absolute angle calculation unit 71 calculates the motor absolute angle θma that is corrected based on mechanical elastic deformation of the steering mechanism 4 caused by the pinion shaft torque Tp applied to the steering mechanism 4.

Figure 6:
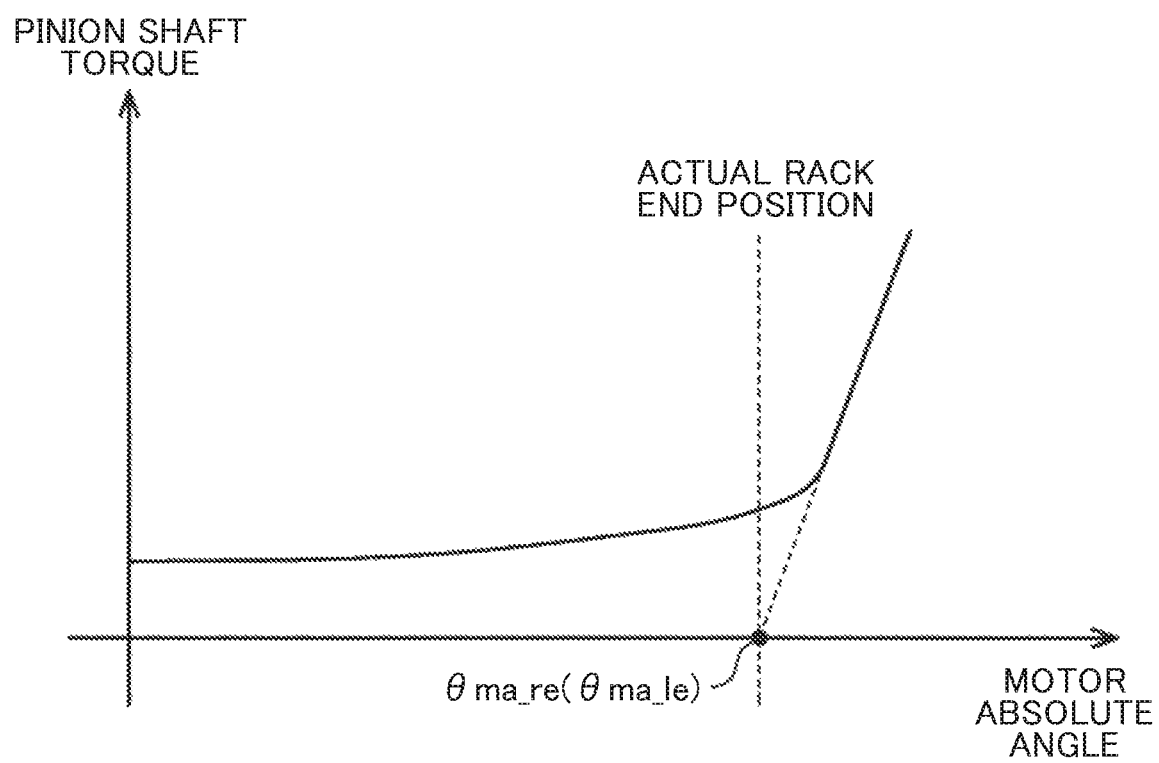
FIG. 6 is a schematic view showing a relationship between mechanical elastic deformation of a steering mechanism and a motor absolute angle.

As shown in FIG. 6, normally, when steering operation is performed by the driver, the steered wheels 3 are steered and the motor absolute angle θma increases according to the pinion shaft torque Tp applied to the steering mechanism 4. Once the motor absolute angle θma exceeds the angle corresponding to the actual rack end position by some degrees, the motor absolute angle θma hardly increases even when the pinion shaft torque Tp increases. This is because, with the rack shaft 12 being located at the rack end position, an increase in the pinion shaft torque Tp causes the motor 21 to rotate only slightly due to mechanical elastic deformation of components of the steering mechanism 4, such as torsion of the steering shaft 11 and compression of the rack shaft 12.

Also in a state where the rack shaft 12 is reciprocated by steering operation, the steering mechanism 4 undergoes elastic deformation according to the pinion shaft torque Tp. The motor absolute angle θma to be calculated has a value shifted in a steering direction from the motor absolute angle θma corresponding to the actual position of the rack shaft 12. The inclination of the pinion shaft torque Tp relative to the motor absolute angle θma is proportional to an elastic modulus K of the steering mechanism 4. Therefore, with the raw motor absolute angle, which is obtained simply by summating the number of rotations of the motor 21 from the origin based on the rotation angle θmc of the motor 21, serving as a reference point, the motor absolute angle θma at the position at which the pinion shaft torque Tp becomes zero along this inclination substantially matches the actual rack end position.

Based on this principle, the motor absolute angle calculation unit 71 obtains rotation of the motor 21 due to elastic deformation by multiplying the elastic modulus K of the steering mechanism 4 by the pinion shaft torque Tp (K×Tp), and detects a value obtained by subtracting this rotation from the raw motor absolute angle as the motor absolute angle θma. In the present embodiment, the elastic modulus K of the steering mechanism 4 is obtained in advance by experiment, simulation, etc. using an actual model of the steering mechanism 4.

As shown in FIG. 5, the motor absolute angle θma thus calculated is output to the output switching unit 72. When the origin of the control steered angle θs is not yet set, the output switching unit 72 outputs the motor absolute angle θma to the end position-corresponding motor angle setting unit 74 and the control steered angle origin setting unit 75. When the origin of the control steered angle θs has already been set, the output switching unit 72 outputs the motor absolute angle θma based on the number of rotations from the origin, i.e., the control steered angle θs, to the current correction value calculation unit 62.

The steering torque Ts, the phase current values I, and the angular velocity ωm are input into the end position determination unit 73. When a state where the angular velocity ωm of the motor 21 is equal to or higher than a predetermined angular velocity ωth and the pinion shaft torque Tp is equal to or larger than a predetermined torque Tth continues for a predetermined time or longer, the end position determination unit 73 determines that the rack shaft 12 is located at either one of the right and left rack end positions, and outputs a determination signal S indicating the determination result to the end position-corresponding motor angle setting unit 74. The predetermined angular velocity ωth is a value indicating that the motor 21 is stopped, and is set to a value somewhat larger than zero to allow for the influence of signal noise etc. The predetermined torque Tth is set to an appropriate value larger than zero indicating a torque that allows the steered wheels 3 to be steered on a normal road surface.

The end position-corresponding motor angle setting unit 74 determines the steering direction based on the sign of the input motor absolute angle θma. The end position-corresponding motor angle setting unit 74 sets the motor absolute angle θma when the rack shaft 12 is determined to be located at the left-side rack end position as the left-side end position-corresponding motor angle θma_le. The end position-corresponding motor angle setting unit 74 sets the motor absolute angle θma when the rack shaft 12 is determined to be located at the right-side rack end position as the right-side end position-corresponding motor angle θma_re. Even after the end position-corresponding motor angle setting unit 74 once sets the right and left end position-corresponding motor angles $\theta ma\_re$, $\theta ma\_le$, when a motor absolute angle $\theta ma$ having the same sign as and a larger absolute value than the end position-corresponding motor angle $\theta ma\_re$ or $\theta ma\_le$ is detected, the end position-corresponding motor angle setting unit 74 sets this motor absolute angle $\theta ma$ as a new end position-corresponding motor angle $\theta ma\_re$ or $\theta ma\_le$.

Figure 7:
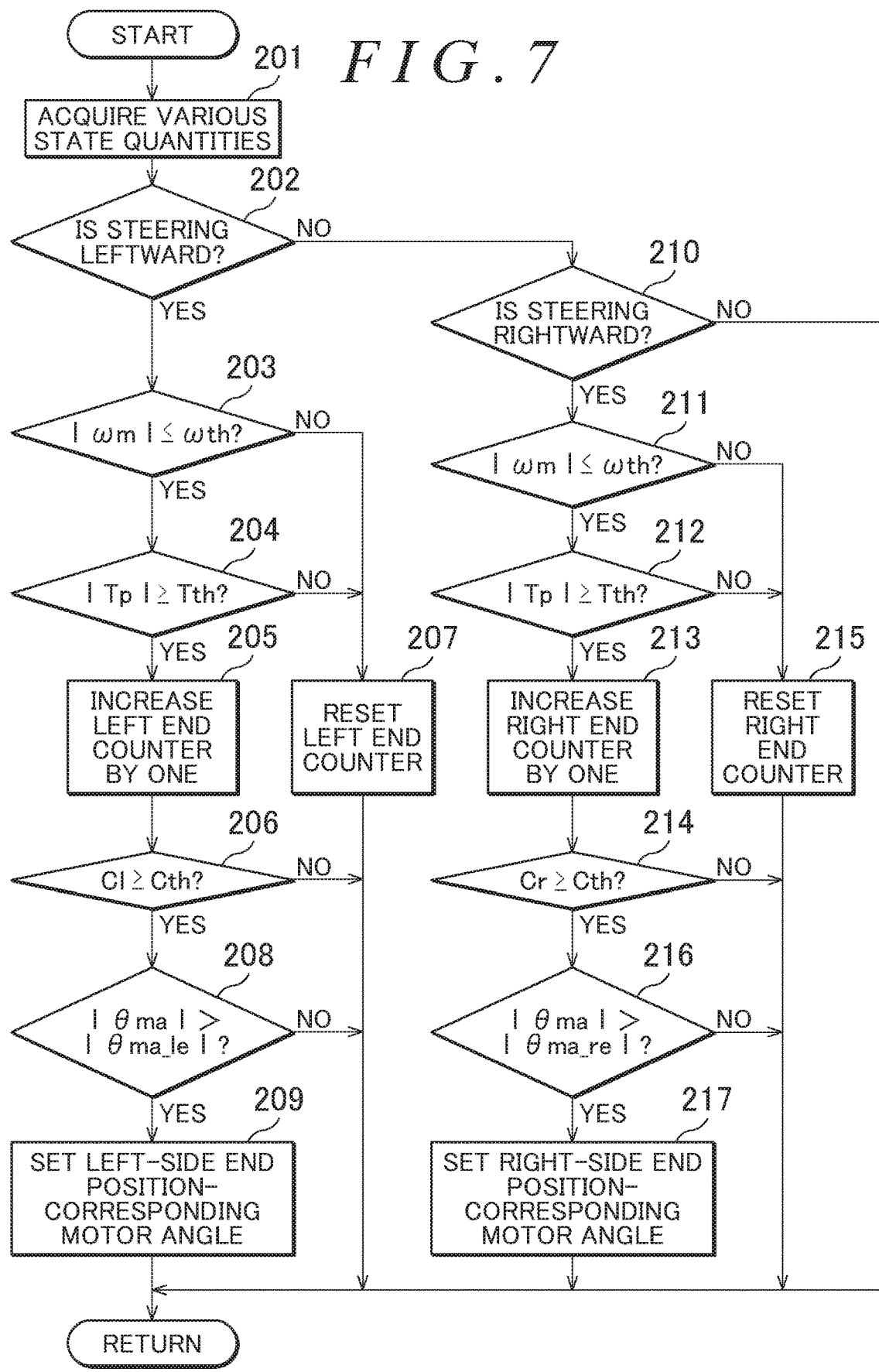
FIG. 7 is a flowchart showing steps of a process of setting an end position-corresponding motor angle.

Next, steps of setting the end position-corresponding motor angles $\theta ma\_re$, $\theta ma\_le$ will be described. As shown in the flowchart of FIG. 7, upon acquiring various state quantities (step 201), the control steered angle calculation unit 53 determines whether the steering is leftward based on the sign of the calculated motor absolute angle $\theta ma$ (step 202). When the steering is leftward (step 202: YES), the control steered angle calculation unit 53 determines whether the absolute value of the angular velocity $\omega m$ of the motor 21 is equal to or smaller than that of the predetermined angular velocity $\omega th$ (step 203). When the absolute value of the angular velocity $\omega m$ is equal to or smaller than that of the predetermined angular velocity $\omega th$ (step 203: YES), the control steered angle calculation unit 53 determines whether the absolute value of the pinion shaft torque Tp is equal to or larger than that of the predetermined torque Tth (step 204). When the pinion shaft torque Tp is equal to or larger than the predetermined torque Tth (step 204: YES), the control steered angle calculation unit 53 increases a left end counter Cl by one (step 205: Cl=Cl+1), and determines whether the left end counter Cl is equal to or larger than a predetermined counter Cth (step 206). On the other hand, when the absolute value of the angular velocity $\omega m$ is larger than that of the predetermined angular velocity $\omega th$ (step 203: NO), or the absolute value of the pinion shaft torque Tp is smaller than that of the predetermined torque Tth (step 204: NO), the control steered angle calculation unit 53 resets the left end counter Cl (step 207: Cl=0).

When the left end counter Cl becomes equal to or larger than the predetermined counter Cth (step 206: YES), for example, as the driver further turns the steering wheel in the state where the rack shaft 12 is located at the left-side rack end position, the control steered angle calculation unit 53 determines whether the absolute value of the motor absolute angle $\theta ma$ calculated in the current calculation cycle is larger than the absolute value of the left-side end position-corresponding motor angle $\theta ma\_le$ stored in the memory 55 (step 208). In the memory 55, default values of the right and left end position-corresponding motor angles $\theta ma\_re$, $\theta ma\_le$ are set to zero. When the absolute value of the motor absolute angle $\theta ma$ is larger than the absolute value of the left-side end position-corresponding motor angle $\theta ma\_le$ (step 208: YES), the control steered angle calculation unit 53 sets this motor absolute angle $\theta ma$ as the left-side end position-corresponding motor angle $\theta ma\_le$, and resets the left end counter Cl (step 209). On the other hand, when the left end counter Cl is smaller than the predetermined counter Cth (step 206: NO), or the absolute value of the motor absolute angle $\theta ma$ is equal to or smaller than the absolute value of the left-side end position-corresponding motor angle $\theta ma\_le$ (step 208: NO), the control steered angle calculation unit 53 does not set this motor absolute angle $\theta ma$ as a new left-side end position-corresponding motor angle $\theta ma\_le$.

When the steering is not leftward (step 202: NO), the control steered angle calculation unit 53 determines whether the steering is rightward (step 210). When the steering is rightward (step 210: YES), the control steered angle calculation unit 53 makes the end position determination in the same manner as in steps 203 and 204 (steps 211, 212). When the result of the end position determination is affirmative (steps 211, 212: YES), the control steered angle calculation unit 53 increases a right end counter Cr by one (step 213: Cr=Cr+1), and determines whether the right end counter Cr is equal to or larger than the predetermined counter Cth (step 214). On the other hand, when the result of the end position determination is negative (steps 211, 212: NO), the control steered angle calculation unit 53 resets the right end counter Cr (step 215: Cr=0).

When the right end counter Cr becomes equal to or larger than the predetermined counter Cth (step 214: YES), the control steered angle calculation unit 53 determines whether the absolute value of the motor absolute angle $\theta ma$ calculated in the current calculation cycle is larger than the absolute value of the right-side end position-corresponding motor angle $\theta ma\_re$ stored in the memory 55 (step 216). When the absolute value of the motor absolute angle $\theta ma$ is larger than the absolute value of the right-side end position-corresponding motor angle $\theta ma\_re$ (step 216: YES), the control steered angle calculation unit 53 sets this motor absolute angle $\theta ma$ as the right-side end position-corresponding motor angle $\theta ma\_re$, and resets the right end counter Cr (step 217). On the other hand, when the right end counter Cr is smaller than the predetermined counter Cth (step 214: NO), or the absolute value of the motor absolute angle $\theta ma$ is equal to or smaller than the absolute value of the right-side end position-corresponding motor angle $\theta ma\_re$ (step 216: NO), the control steered angle calculation unit 53 does not set this motor absolute angle $\theta ma$ as a new right-side end position-corresponding motor angle $\theta ma\_re$. When the steering is not rightward (step 210: NO), the control steered angle calculation unit 53 does not execute the processes in steps 203 to 209 and steps 211 to 217.

Next, setting of the origin of the control steered angle $\theta s$ will be described. After the end position-corresponding motor angles $\theta ma\_re$, $\theta ma\_le$ are set or renewed, the control steered angle origin setting unit 75 sets the origin of the control steered angle $\theta s$ based on the end position-corresponding motor angles $\theta ma\_re$, $\theta ma\_le$ stored in the memory 55, when the detected motor absolute angle $\theta ma$ becomes by the first angle $\theta 1$ or larger closer to the steering neutral position than the set or renewed end position-corresponding motor angles $\theta ma\_re$, $\theta ma\_le$ are.

Figure 8:
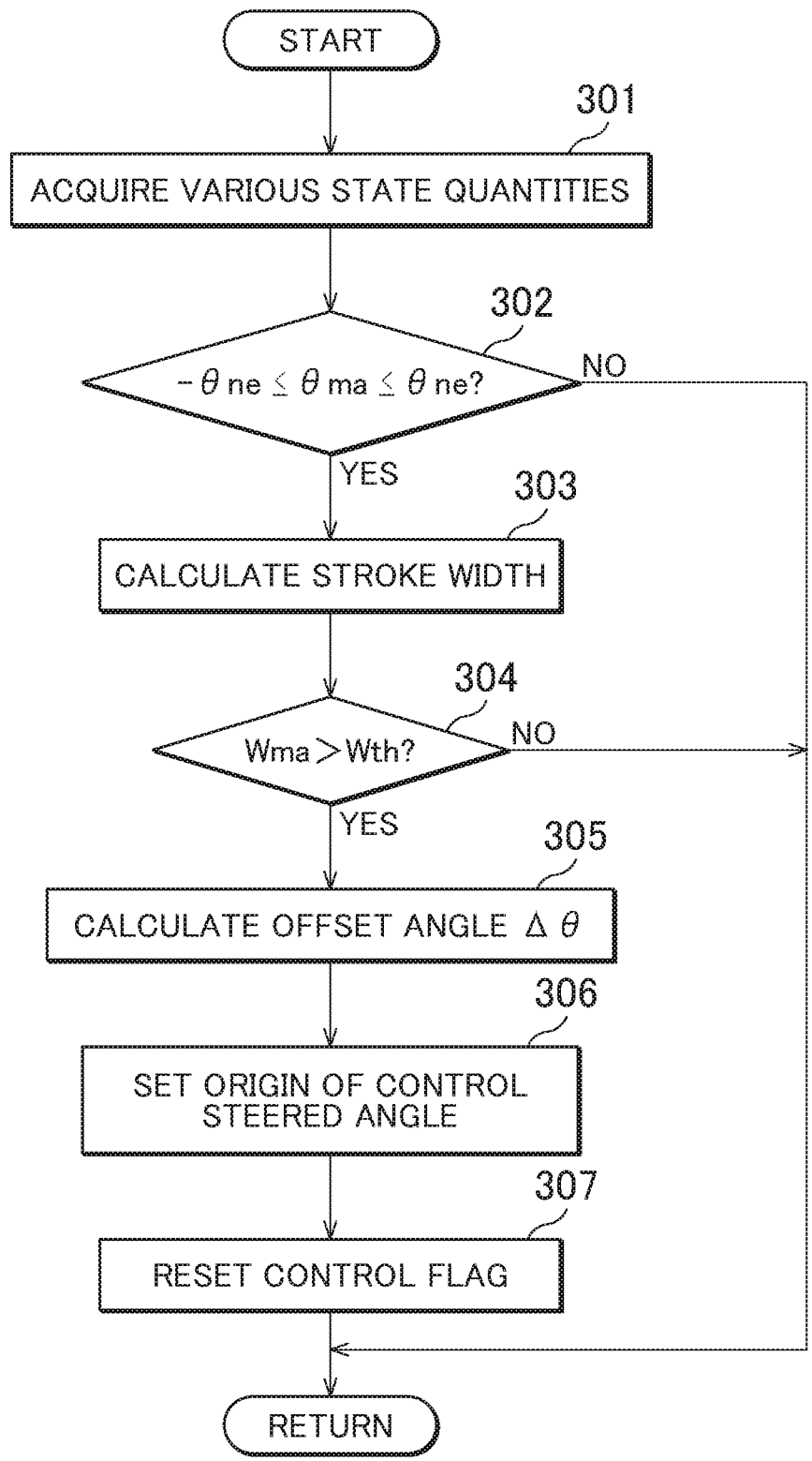
FIG. 8 is a flowchart showing steps of a process of setting an origin of the control steered angle.

Specifically, as shown in FIG. 8, upon acquiring various state quantities (step 301), the control steered angle origin setting unit 75 determines whether the motor absolute angle $\theta ma$ is by the first angle $\theta 1$ or larger closer to the steering neutral position than the right and left end position-corresponding motor angles $\theta ma\_re$, $\theta ma\_le$ are. In particular, the control steered angle origin setting unit 75 determines whether the motor absolute angle $\theta ma$ is within an origin setting permit range ($-\theta ne \leq \theta ma \leq \theta ne$) that is away from the rack end positions (step 302). When the motor absolute angle $\theta ma$ is within the origin setting permit range (step 302: YES), the control steered angle origin setting unit 75 calculates a stroke width Wma that is a sum of the absolute values of the right and left end position-corresponding motor angles $\theta ma\_re$, $\theta ma\_le$ (step 303). Then, the control steered angle origin setting unit 75 determines whether the stroke width Wma is larger than a stroke threshold value Wth indicating a motor absolute angle range corresponding to a full stroke range of the rack shaft 12 (step 304). The stroke threshold value Wth is set to a value somewhat smaller than the motor absolute angle range. When the motor absolute angle $\theta ma$ is not within the origin setting permit range (step 302: NO), the control steered angle origin setting unit 75 does not execute the processes in steps 303 to 307.

When the stroke width Wma is larger than the stroke threshold value Wth (step 304: YES), the control steered angle origin setting unit 75 calculates an average value of the right and left end position-corresponding motor angles θma_re, θma_le as an offset angle Δθ (step 305). Then, the control steered angle origin setting unit 75 sets an angle obtained by subtracting the offset angle from the detected motor absolute angle θma (θma−Δθ) as the origin of the control steered angle θs (step 306), and resets the control flag indicating that the origin of the control steered angle θs should be set (step 307). When the stroke width Wma is equal to or smaller than the stroke threshold value Wth (step 304: NO), the control steered angle origin setting unit 75 does not execute the processes in steps 305 to 307.

As has been described above, the present embodiment can achieve the following operational effects:

(1) The motor absolute angles θma when the rack shaft 12 is determined to be located at the rack end positions are set as the right and left end position-corresponding motor angles θma_re, θma_le. Thus, accurate end position-corresponding motor angles θma_re, θma_le can be set, compared with if, for example, a motor absolute angle when the vehicle is determined to be moving straight forward is set as the origin corresponding to the steering neutral position and the end position-corresponding motor angles are estimated based on this origin.

(2) The motor absolute angle calculation unit 71 acquires the motor absolute angle θma as an angle corrected based on mechanical elastic deformation of the steering mechanism 4 caused by the pinion shaft torque Tp applied thereto. Thus, more accurate end position-corresponding motor angles θma_re, θma_le can be set.

(3) The steering mechanism 4 is configured to transmit rotation of the steering shaft 11, which is composed of the column shaft 14, the intermediate shaft 15, and the pinion shaft 16 coupled together, by converting the rotation into reciprocation of the rack shaft 12 through the rack-and-pinion mechanism 17. The EPS actuator 5 applies the motor torque Tm of the motor 21 to the column shaft 14. Thus, in the present embodiment, the motor torque Tm is transmitted to the steered wheels 3 through the column shaft 14, the intermediate shaft 15, the pinion shaft 16, the rack shaft 12, etc. For this reason, the steering mechanism 4 tends to undergo significant elastic deformation due to not only compression of the rack shaft 12 but also a torque applied by torsion of the intermediate shaft 15 etc. It is therefore significantly effective to set the motor absolute angles θma that are corrected based on elastic deformation occurring in the steering mechanism 4 as the end position-corresponding motor angles θma_re, θma_le.

(4) In the case where the end position determination unit 73 makes a determination based on the pinion shaft torque Tp and the angular velocity ωm of the motor 21 as in the present embodiment, when the steered wheel 3 hits a curb etc., the end position determination unit 73 may incorrectly determine that the rack shaft 12 is located at the rack end position, even though the rack shaft 12 is actually located at a position short of the rack end position. As a result, inaccurate angles may be set as the end position-corresponding motor angles θma_re, θma_le. In the present embodiment, however, even after the end position-corresponding motor angles θma_re, θma_le are once set, when a motor absolute angle θma having the same sign as and a larger absolute value than the end position-corresponding motor angle θma_re or θma_le is detected, this motor absolute angle θma is set as a new end position-corresponding motor angle θma_re or θma_le. This can reduce the likelihood that incorrect end position-corresponding motor angles θma_re, θma_le are set.

(5) The average value of the right and left end position-corresponding motor angles θma_re, θma_le is calculated as the offset angle Δθ, and an angle obtained by subtracting the offset angle Δθ from the motor absolute angle θma is set as the origin of the control steered angle θs. Thus, the origin corresponding to the steering neutral position can be easily set.

(6) For example, when the rack shaft 12 is determined to be located at the rack end position as the steered wheel 3 hits a curb etc., and incorrect end position-corresponding motor angles θma_re, θma_le are set, the stroke width Wma that is the sum of the absolute values of the right and left end position-corresponding motor angles θma_re, θma_le becomes smaller than the stroke threshold value Wth. With this in mind, the origin is not set when the stroke width Wma is smaller than the stroke threshold value Wth. This can reduce the likelihood that an incorrect origin of the control steered angle θs is set.

(7) When the absolute value of the control steered angle θs exceeds the absolute value of the near-end steered angle θne, the steering controller 6 executes the end hitting impact mitigation control of reducing the absolute value of the q-axis current command value Iq*, which is the torque command value, based on the increase in the absolute value of the control steered angle θs. The origin of the control steered angle θs is set in such a manner that, when the right and left end position-corresponding motor angles θma_re, θma_le are set, the origin based on these right and left end position-corresponding motor angles θma_re, θma_le is set after the motor absolute angle θma becomes by the first angle θ1 or larger closer to the steering neutral position than the end position-corresponding motor angles θma_re, θma_le are. Thus, the origin of the control steered angle θs is set immediately after the right and left end position-corresponding motor angles θma_re, θma_le are set, i.e., in the state where the rack shaft 12 is still located at the rack end position. The end hitting impact mitigation control thus executed can prevent the EPS actuator 5 from suddenly applying a steering reaction force.

(8) When the angular velocity ωm of the motor 21 is equal to or lower than the predetermined angular velocity ωth that indicates the stopped state of the motor 21, and the pinion shaft torque Tp applied to the steering mechanism 4 is equal to or larger than the predetermined torque Tth, the rack shaft 12 is determined to be located at the rack end position. Thus, the rack shaft 12 can be determined to be located at the rack end position easily and accurately.

Next, a second embodiment of the steering controller will be described in accordance with the drawings. For the convenience of description, the components that are the same as those in the first embodiment will be denoted by the same reference signs and description thereof will be omitted.

Figure 9:
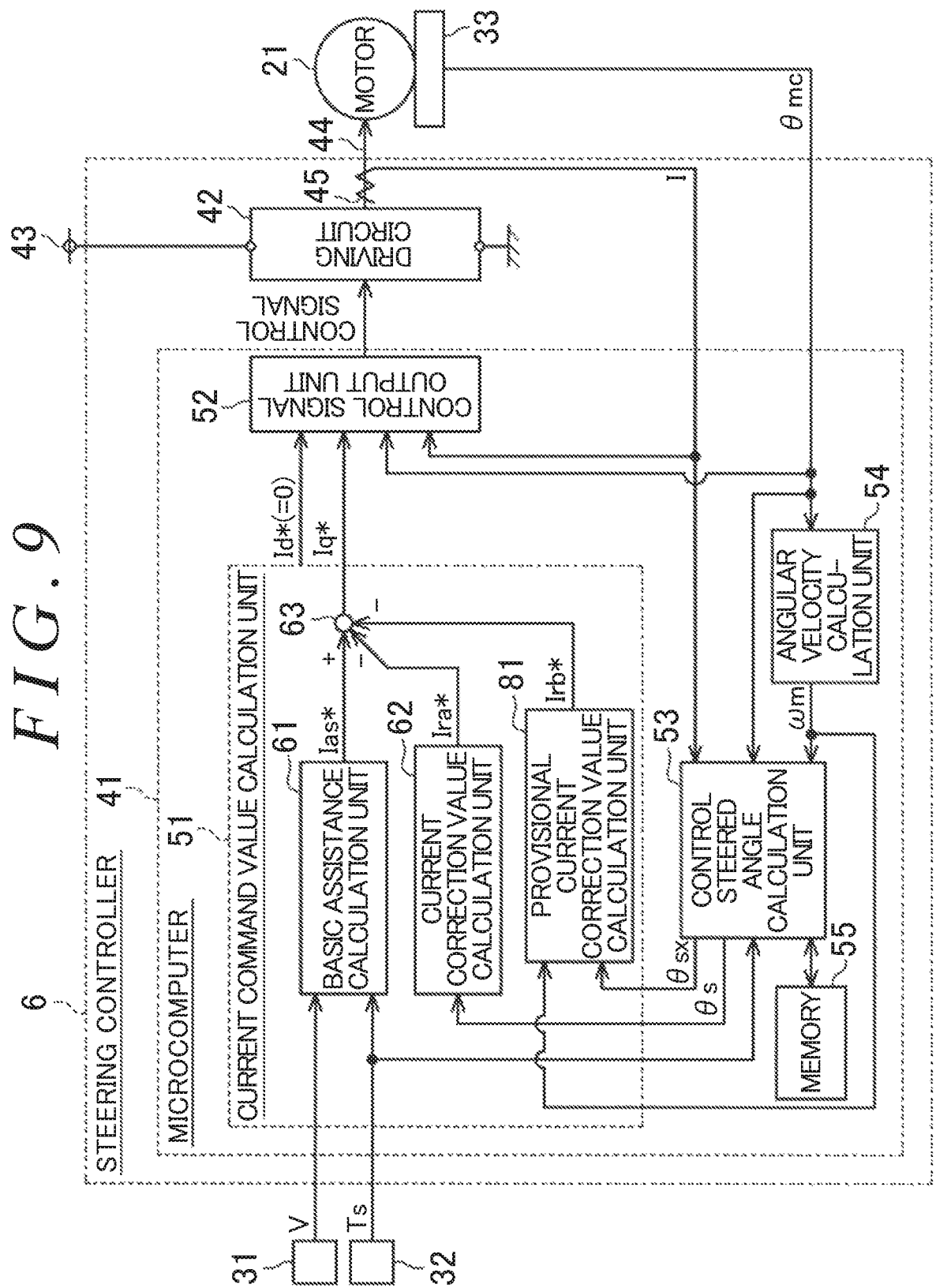
FIG. 9 is a block diagram of a steering controller of a second embodiment.

As shown in FIG. 9, the current command value calculation unit 51 of the present embodiment includes a provisional current correction value calculation unit 81 in addition to the basic assistance calculation unit 61 and the current correction value calculation unit 62. The control steered angle calculation unit 53 not only calculates the control steered angle θs as in the first embodiment, but also, when either one of the right and left ends of the rack shaft 12 hits the rack housing multiple times in the state where the origin of the control steered angle θs is not set, sets a provisional end position-corresponding steered angle θma_xe that is represented by the motor absolute angle θma at the rack end position on the same side as the one end hitting the rack housing. Then, the control steered angle calculation unit 53 outputs, to the provisional current correction value calculation unit 81, a provisional end separation angle θsx that is a value obtained by subtracting the motor absolute angle θma from the provisional end position-corresponding steered angle θma_xe, and the provisional current correction value calculation unit 81 outputs a provisional current correction value Irb*. After setting the origin of the control steered angle θs, the control steered angle calculation unit 53 does not calculate the provisional end separation angle θsx but calculates only the control steered angle θs.

Figure 10:
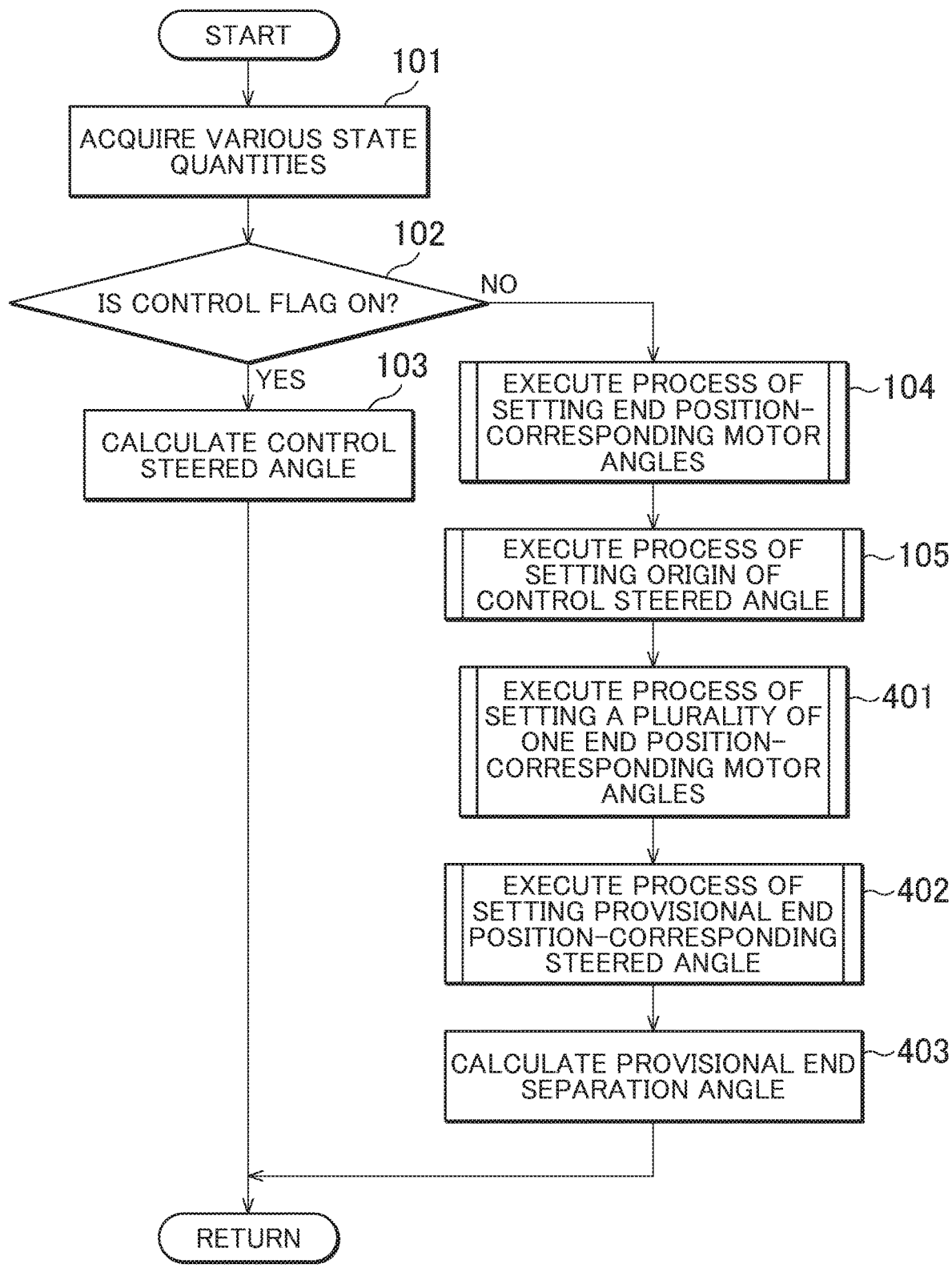
FIG. 10 is a flowchart showing steps of a process executed by a control steered angle calculation unit of the second embodiment.

In particular, as shown in the flowchart of FIG. 10, after executing the process of setting the origin of the control steered angle in step 105, the control steered angle calculation unit 53 executes a process of setting a plurality of one end position-corresponding motor angles in which first and second one end position-corresponding motor angles θma_x1, θma_x2 are set (step 401), and executes a process of setting a provisional end position-corresponding steered angle (step 402). Then, based on the provisional end position-corresponding steered angle θma_xe set in step 402, the control steered angle calculation unit 53 calculates the provisional end separation angle θsx (step 403). The control steered angle calculation unit 53 executes the other processes than those in steps 401 to 403 in the same manner as in the first embodiment.

The provisional current correction value calculation unit 81 calculates the provisional current correction value Irb* based on the provisional end separation angle θsx output from the control steered angle calculation unit 53 and the angular velocity ωm. When no provisional end separation angle θsx is output from the control steered angle calculation unit 53, the provisional current correction value calculation unit 81 does not calculate the provisional current correction value Irb*, or outputs zero as the provisional current correction value Irb*. The provisional current correction value Irb* is a correction component for correcting the basic current command value Ias* such that a steering reaction force is applied to the steering shaft 11, and provisional end hitting impact mitigation control of mitigating the impact of the rack shaft 12 hitting the rack housing is executed as the provisional current correction value Irb* is output to the subtractor 63.

Figure 11:
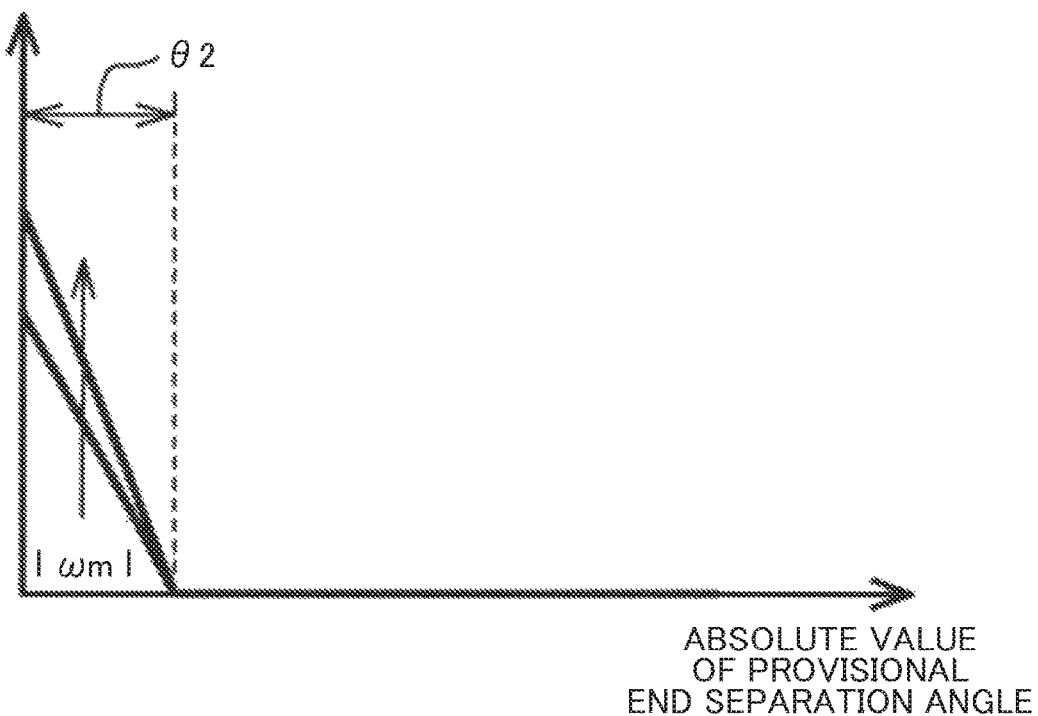
FIG. 11 is a map showing a relationship between a current correction value and a control steered angle in provisional end hitting impact mitigation control.

The provisional current correction value calculation unit 81 has a map as shown in FIG. 11, for example, and calculates the provisional current correction value Irb* from the provisional end separation angle θsx and the angular velocity ωm based on this map. In this map, the provisional current correction value Irb* is set such that a larger provisional current correction value Irb* is calculated as the absolute value of the provisional end separation angle θsx is closer to zero and as the absolute value of the angular velocity ωm is larger. The provisional current correction value Irb* is set to become zero when the absolute value of the provisional end separation angle θsx becomes equal to or larger than a second angle θ2. The second angle θ2 is an angle from the provisional end position-corresponding steered angle θma_xe to a provisional near-end steered angle θnxe that is closer to the steering neutral position than the provisional end position-corresponding steered angle θma_xe is. The provisional near-end steered angle θnxe is set to a relatively small angle not too far away from the provisional end position-corresponding steered angle θma_xe. The size of the second angle θ2 in the present embodiment is set to be equal to the size of the first angle θ1.

Thus, when the angle from the motor absolute angle θma to the provisional near-end steered angle θnxe becomes smaller than the second angle θ2, the current command value calculation unit 51 executes the provisional end hitting impact mitigation control.

In addition to the basic current command value Ias*, the current correction value Ira* or the provisional current correction value Irb* is input into the subtractor 63 according to which of the control steered angle θs and the provisional end separation angle θsx the control steered angle calculation unit 53 calculates. The subtractor 63 calculates the q-axis current command value Iq* by subtracting the current correction value Ira* or the provisional current correction value Irb* from the basic current command value Ias* calculated by the basic assistance calculation unit 61. Thus, when the absolute value of the control steered angle θs exceeds the absolute value of the near-end steered angle θne, the microcomputer 41 executes the end hitting impact mitigation control of reducing the absolute value of the q-axis current command value Iq*, which serves as the torque command value, based on the increase in the absolute value of the control steered angle θs. Alternatively, when the provisional end separation angle θsx becomes smaller than the second angle θ2, the microcomputer 41 executes the provisional end hitting impact mitigation control of reducing the absolute value of the q-axis current command value Iq*, which serves as the torque command value, based on the decrease in the provisional end separation angle θsx.

Figure 12:
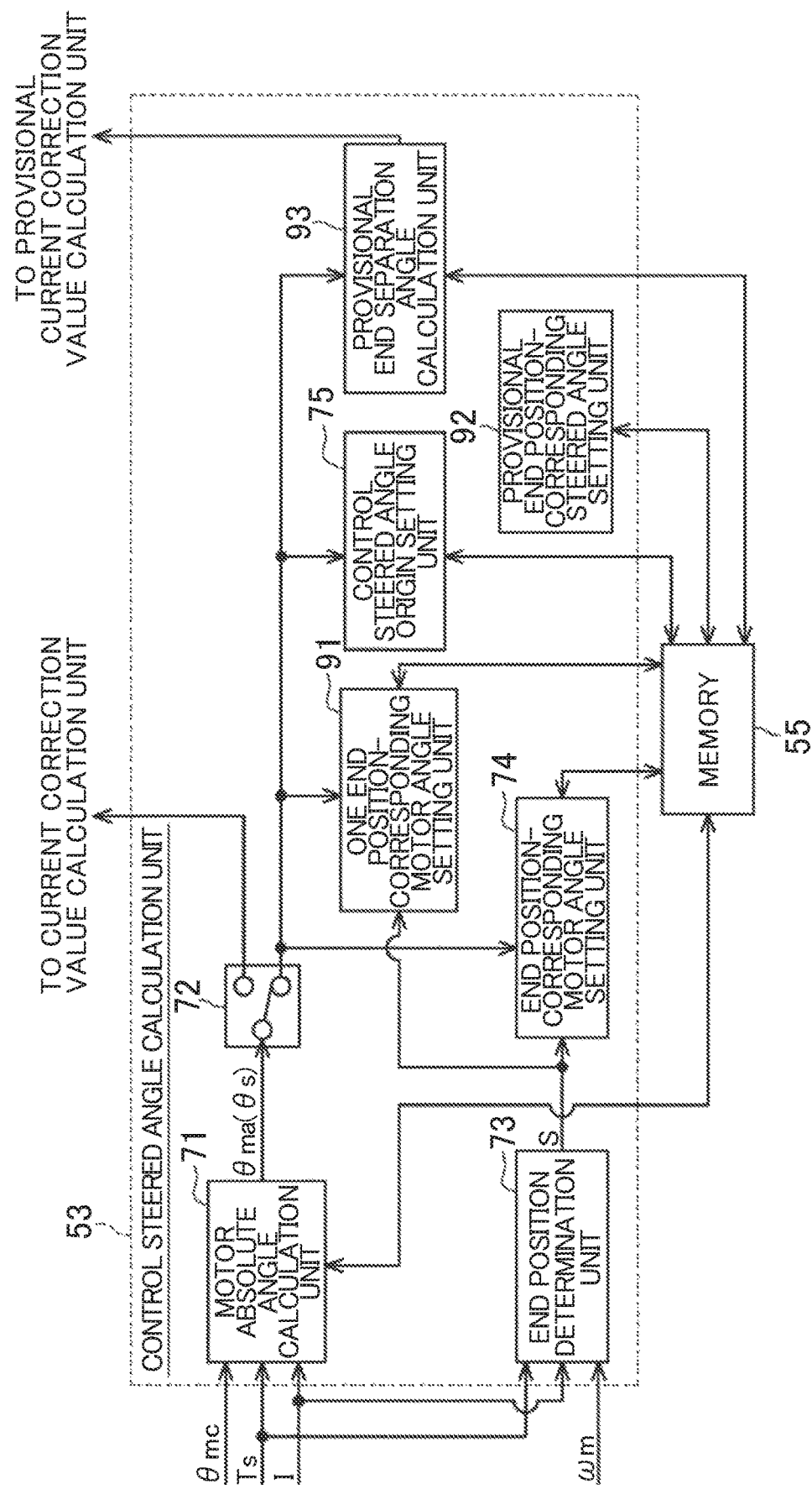
FIG. 12 is a block diagram of the control steered angle calculation unit of the second embodiment.

Next, setting of the provisional end position-corresponding steered angle θma_xe will be described. As shown in FIG. 12, the control steered angle calculation unit 53 of the present embodiment includes, in addition to the blocks in the first embodiment, a one end position-corresponding motor angle setting unit 91, a provisional end position-corresponding steered angle setting unit 92, and a provisional end separation angle calculation unit 93.

The determination signal S and the motor absolute angle θma are input into the one end position-corresponding motor angle setting unit 91. The one end position-corresponding motor angle setting unit 91 is connected to the memory 55. When the end position-corresponding motor angle setting unit 74 sets either one of the end position-corresponding motor angles θma_re, θma_le in the memory 55, the one end position-corresponding motor angle setting unit 91 sets the one of the end position-corresponding motor angles θma_re, θma_le as the first one end position-corresponding motor angle θma_x1 constituting one of the one end position-corresponding motor angles. Moreover, the one end position-corresponding motor angle setting unit 91 sets, as the second one end position-corresponding motor angle θma_x2, the motor absolute angle θma at the time when the determination signal S indicating that the rack shaft 12 is located at the end position of the same side is input after the motor absolute angle θma changes by an amount equal to or larger than a predetermined steering amount θth indicating that the steering wheel has been turned back since the first one end position-corresponding motor angle θma_x1 is set. For example, the predetermined steering amount θth is set to be a steering amount of about half the stroke threshold value Wth, i.e., from the rack end position to the steering neutral position, and is set to a sufficiently large value relative to detection error of the rotation sensor 33.

Figure 13A:
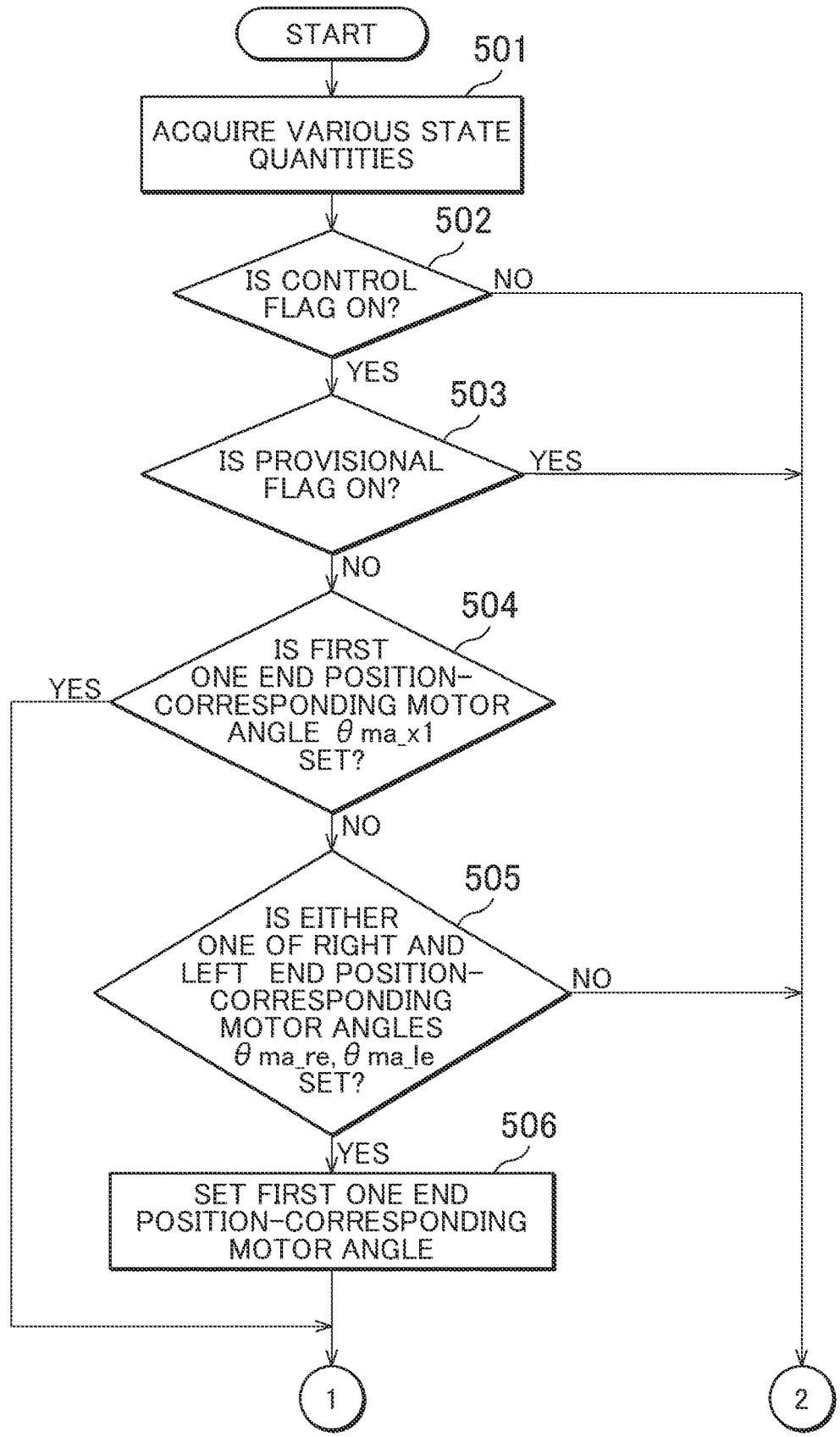
FIGS. 13a and 13b are flowcharts showing steps of a process of setting a plurality of one end position-corresponding motor angles.
Figure 13B:
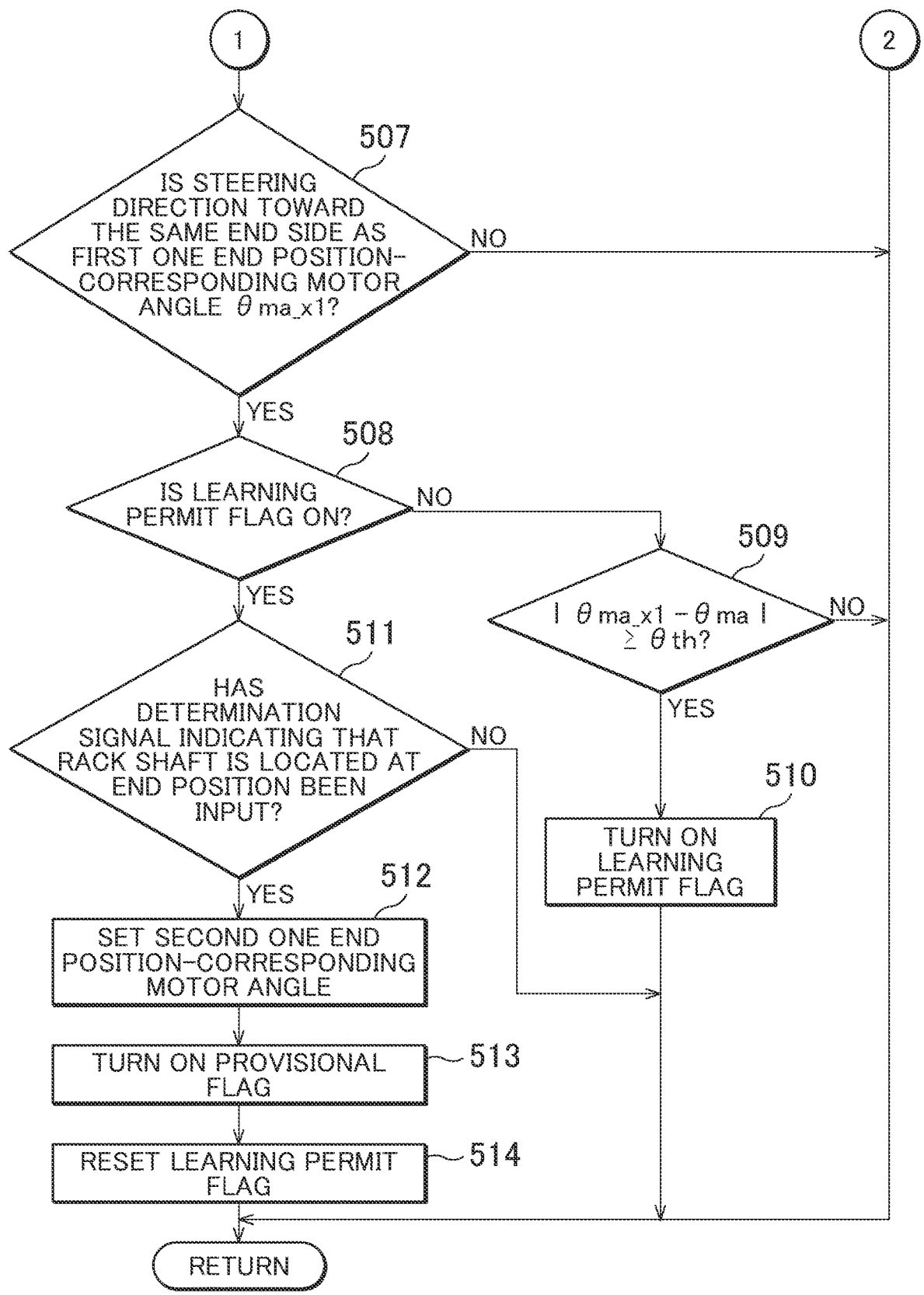

In particular, as shown in the flowchart of FIG. 13, the one end position-corresponding motor angle setting unit 91 executes the processes in steps 501 to 514 as the process in step 401. Upon acquiring various state quantities (step 501), the one end position-corresponding motor angle setting unit 91 determines whether a control flag is on (step 502). When the control flag is on (step 502: YES), the one end position-corresponding motor angle setting unit 91 determines whether a provisional flag is on (step 503). The provisional flag is a flag indicating whether the first and second one end position-corresponding motor angles θma_x1, θma_x2 serving as a basis for the provisional end position-corresponding steered angle θma_xe are set in the memory 55. At a time point when electric power supply to the steering controller 6 is resumed, the provisional flag has been reset. When the control flag is not on (step 502: NO) and the provisional flag is on (step 503: YES), the one end position-corresponding motor angle setting unit 91 does not further execute the process in step 402.

Next, when the provisional flag is not on (step 503: NO), the one end position-corresponding motor angle setting unit 91 determines whether the first one end position-corresponding motor angle θma_x1 is set (step 504). When the first one end position-corresponding motor angle θma_x1 is not set (step 504: NO), the one end position-corresponding motor angle setting unit 91 determines whether either one of the right and left end position-corresponding motor angles θma_re, θma_le set in step 104 is set (step 505). When either one of the right and left end position-corresponding motor angles θma_re, θma_le is set (step 505: YES), the one end position-corresponding motor angle setting unit 91 sets this angle as the first one end position-corresponding motor angle θma_x1 (step 506). When electric power supply to the steering controller 6 is resumed after being stopped, either one of the end position-corresponding motor angles θma_re, θma_le is first set in the memory 55. Therefore, a state does not arise where both the end position-corresponding motor angles θma_re, θma_le are set in the memory 55 while the first one end position-corresponding motor angle θma_x1 is not set. On the other hand, when the first one end position-corresponding motor angle θma_x1 is set (step 504: YES), the one end position-corresponding motor angle setting unit 91 proceeds to step 507 without executing the process in step 506. When neither of the right and left end position-corresponding motor angles θma_re, θma_le is set (step 505: NO), the one end position-corresponding motor angle setting unit 91 does not further execute the process in step 402.

Next, in step 507, the one end position-corresponding motor angle setting unit 91 determines whether the steering direction is toward the same end side as the first one end position-corresponding motor angle θma_x1, based on the sign of the motor absolute angle θma. When the steering direction is toward the same end side as the first one end position-corresponding motor angle θma_x1 (step 507: YES), the one end position-corresponding motor angle setting unit 91 determines whether a learning permit flag is on (step 508). The learning permit flag is a flag indicating whether the motor absolute angle θma at the time when the end position determination unit 73 determines that the rack shaft 12 is located at the rack end position may be set as the second one end position-corresponding motor angle θma_x2, and this flag has been reset at the time point when electric power supply to the steering controller 6 is resumed.

When the learning permit flag is not on (step 508: NO), the one end position-corresponding motor angle setting unit 91 determines whether the absolute value of a value obtained by subtracting the motor absolute angle θma from the first one end position-corresponding motor angle θma_x1 is larger than the predetermined steering amount θth (step 509). When the absolute value of this subtracted value is larger than the predetermined steering amount θth (step 509: YES), the one end position-corresponding motor angle setting unit 91 turns on the learning permit flag (step 510). When the absolute value of the subtracted value is equal to or smaller than the predetermined steering amount θth (step 509: NO), the one end position-corresponding motor angle setting unit 91 does not turn on the learning permit flag.

On the other hand, when the learning permit flag is on (step 508: YES), the one end position-corresponding motor angle setting unit 91 determines whether the determination signal S indicating that the rack shaft 12 is located at the rack end position has been input (step 511). When the determination signal S indicating that the rack shaft 12 is located at the rack end position has been input (step 511: YES), the one end position-corresponding motor angle setting unit 91 sets the motor absolute angle θma in the same calculation cycle as the second one end position-corresponding motor angle θma_x2 (step 512), and turns on the provisional flag (step 513) and resets the learning permit flag (step 514).

As shown in FIG. 12, when both the first and second one end position-corresponding motor angles θma_x1, θma_x2 are set in the memory 55, the provisional end position-corresponding steered angle setting unit 92 calculates a difference α between the first one end position-corresponding motor angle θma_x1 and the second one end position-corresponding motor angle θma_x2. When the difference α is equal to or smaller than a predetermined difference αth, the provisional end position-corresponding steered angle setting unit 92 calculates an average value of the first and second one end position-corresponding motor angles θma_x1, θma_x2 as the provisional end position-corresponding steered angle θma_xe. The predetermined difference αth is set to a value somewhat larger than zero to allow for, for example, a variation in the correction amount of the motor absolute angle θma based on mechanical elastic deformation attributable to detection error of the rotation sensor 33, detection error of the torque sensor 32, etc. Next, when the motor absolute angle θma is by the second angle θ2 or larger closer to the steering neutral position than the calculated provisional end position-corresponding steered angle θma_xe is, the provisional end position-corresponding steered angle setting unit 92 sets this provisional end position-corresponding steered angle θma_xe in the memory 55.

Figure 14A:
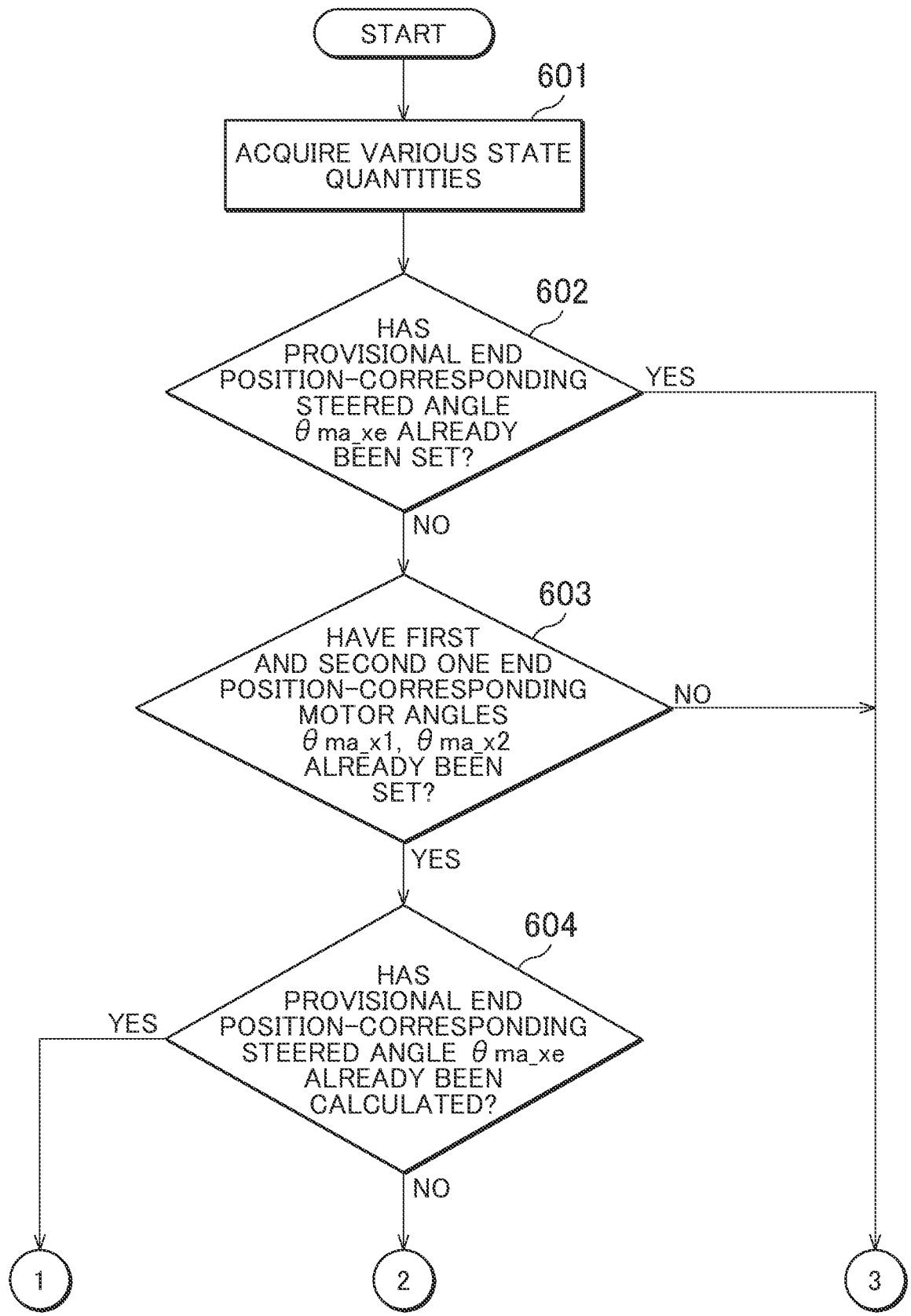

In particular, as shown in the flowchart of FIG. 14, the provisional end position-corresponding steered angle setting unit 92 executes the processes in steps 601 to 610 as the process in step 402. Upon acquiring various state quantities (step 601), the provisional end position-corresponding steered angle setting unit 92 determines whether the provisional end position-corresponding steered angle θma_xe is set (step 602). When the provisional end position-corresponding steered angle θma_xe is set (step 602: YES), the provisional end position-corresponding steered angle setting unit 92 does not further execute the process in step 403. However, when the provisional end position-corresponding steered angle θma_xe is not set (step 602: NO), the provisional end position-corresponding steered angle setting unit 92 determines whether the first and second one end position-corresponding motor angles θma_x1, θma_x2 are set in the memory 55 (step 603). When the first and second one end position-corresponding motor angles θma_x1, θma_x2 are not set (step 603: NO), the provisional end position-corresponding steered angle setting unit 92 does not further execute the process in step 403. However, when the first and second one end position-corresponding motor angles θma_x1, θma_x2 are set (step 603: YES), the provisional end position-corresponding steered angle setting unit 92 determines whether the provisional end position-corresponding steered angle θma_xe has already been calculated (step 604). When the provisional end position-corresponding steered angle θma_xe has not yet been calculated (step 604: NO), the provisional end position-corresponding steered angle setting unit 92 determines whether the difference α between the first one end position-corresponding motor angle θma_x1 and the second one end position-corresponding motor angle θma_x2 is equal to or smaller than the predetermined difference αth (step 605). When the difference α is equal to or smaller than the predetermined difference αth (step 605: YES), the provisional end position-corresponding steered angle setting unit 92 calculates an average value of the first one end position-corresponding motor angle θma_x1 and the second one end position-corresponding motor angle θma_x2 as the provisional end position-corresponding steered angle θma_xe (step 606), and proceeds to step 607. When the provisional end position-corresponding steered angle θma_xe has already been calculated (step 604: YES), the provisional end position-corresponding steered angle setting unit 92 proceeds to step 607 without executing the processes in steps 605 and 606.

Next, in step 607, the provisional end position-corresponding steered angle setting unit 92 determines whether the absolute value of a value obtained by subtracting the motor absolute angle θma from the provisional end position-corresponding steered angle θma_xe is equal to or larger than the second angle θ2, i.e., whether the motor absolute angle θma has become by the second angle θ2 or larger closer to the steering neutral position than the provisional end position-corresponding steered angle θma_xe is. When the motor absolute angle θma has become by the second angle θ2 or larger closer to the steering neutral position than the provisional end position-corresponding steered angle θma_xe is (step 607: YES), the provisional end position-corresponding steered angle setting unit 92 sets the calculated provisional end position-corresponding steered angle θma_xe in the memory 55 (step 608). On the other hand, when the motor absolute angle θma has not become by the second angle θ2 or larger closer to the steering neutral position than the provisional end position-corresponding steered angle θma_xe is (step 607: NO), the provisional end position-corresponding steered angle setting unit 92 does not execute the process in step 608.

When the difference α is larger than the predetermined difference αth (step 605: NO), the provisional end position-corresponding steered angle setting unit 92 sets a larger one of the first and second one end position-corresponding motor angles θma_x1, θma_x2 as a new first one end position-corresponding motor angle θma_x1, and deletes the other one (step 609). Then, the provisional end position-corresponding steered angle setting unit 92 resets the provisional flag (step 610).

As shown in FIG. 12, the motor absolute angle θma is input into the provisional end separation angle calculation unit 93. When the provisional end position-corresponding steered angle θma_xe is set in the memory 55, the provisional end separation angle calculation unit 93 outputs, to the provisional current correction value calculation unit 81, a value obtained by subtracting the motor absolute angle θma from the provisional end position-corresponding steered angle θma_xe as the provisional end separation angle θsx. Thus, the provisional end hitting impact mitigation control is executed as the provisional current correction value Irb* is output from the provisional current correction value calculation unit 81. When the provisional end position-corresponding steered angle θma_xe is not set in the memory 55, and the origin of the control steered angle θs is set, the provisional end separation angle calculation unit 93 neither calculates the provisional end separation angle θsx nor outputs the provisional end separation angle θsx to the provisional current correction value calculation unit 81.

Next, operational effects of the present embodiment will be described. The present embodiment can achieve the following operational effects in addition to the operational effects (1) to (8) of the first embodiment.

(9) In the state where the origin of the control steered angle θs is not set, the steering controller 6 of the present embodiment sets the provisional end position-corresponding steered angle θma_xe based on the first and second one end position-corresponding motor angles θma_x1, θma_x2, and executes the provisional end hitting impact mitigation control of reducing the absolute value of the q-axis current command value Iq*, which is the torque command value, based on a decrease in the provisional end separation angle θsx.

Here, it is expected that, depending on the running conditions of the vehicle, for example, only either one of the right and left ends of the rack shaft 12 repeatedly hits the rack housing. However, unless both right and left ends of the rack shaft 12 hit the rack housing, the origin of the control steered angle θs is not set and the end hitting impact mitigation control is not executed. As a result, the impact of the rack shaft 12 hitting the rack housing may give a sense of discomfort to the driver. Moreover, in view of the case where either one of the right and left end position-corresponding motor angles θma_re, θma_le is set as the steered wheel 3 hits a curb etc., for example, the end position-corresponding motor angle that is set based only on one-time hitting of the rack shaft 12 may not accurately correspond to the actual end position.

In the present embodiment, however, even in the state where the origin of the control steered angle θs is not set, for example, even in a state where appropriate angles of neither the right and left end position-corresponding motor angles θma_re, θma_le are set or a state where only one of the right and left end position-corresponding motor angles θma_re, θma_le is set, an appropriate provisional end position-corresponding steered angle θma_xe corresponding to the actual rack end position can be set based on the first and second one end position-corresponding motor angles θma_x1, θma_x2. Even when only one end of the rack shaft 12 repeatedly hits the rack housing in the state where the origin of the control steered angle θs is not set, the impact of hitting of the one end can be mitigated by executing the provisional end hitting impact mitigation control based on the provisional end position-corresponding steered angle θma_xe.

(10) After calculating the provisional end position-corresponding steered angle θma_xe, the provisional end position-corresponding steered angle setting unit 92 sets the provisional end position-corresponding steered angle θma_xe when the motor absolute angle θma becomes by the second angle θ2 or larger closer to the steering neutral position than the provisional end position-corresponding steered angle θma_xe is. Thus, the provisional end position-corresponding steered angle θma_xe is set immediately after the first and second one end position-corresponding motor angles θma_x1, θma_x2 are set, i.e., in the state where the rack shaft 12 is still located at the end position. The provisional end hitting impact mitigation control thus executed can prevent the EPS actuator 5 from suddenly applying a steering reaction force.

(11) The provisional end position-corresponding steered angle setting unit 92 sets an average value of the first and second one end position-corresponding motor angles θma_x1, θma_x2 as the provisional end position-corresponding steered angle θma_xe. Thus, the provisional end position-corresponding steered angle θma_xe can be appropriately set.

(12) The provisional end position-corresponding steered angle setting unit 92 sets the provisional end position-corresponding steered angle θma_xe by using the first one end position-corresponding motor angle θma_x1 and the second one end position-corresponding motor angle θma_x2 that is set after the motor absolute angle θma has changed by the predetermined steering amount θth or larger since the first one end position-corresponding motor angle θma_x1 is set. Thus, the second one end position-corresponding motor angle θma_x2 is set when the steering wheel is turned back after the first one end position-corresponding motor angle θma_x1 is set. It is therefore more likely that the second one end position-corresponding motor angle θma_x2 is set after the vehicle has moved from the situation where the first one end position-corresponding motor angle θma_x1 is set. Accordingly, the likelihood can be reduced that, for example, both the first and second one end position-corresponding motor angles θma_x1, θma_x2 are set in a state where the steered wheel 3 is hitting a curb and that the provisional end position-corresponding steered angle θma_xe is set based on these motor angles.

(13) The provisional end position-corresponding steered angle setting unit 92 sets the provisional end position-corresponding steered angle θma_xe when the difference α between the first one end position-corresponding motor angle θma_x1 and the second one end position-corresponding motor angle θma_x2 is equal to or smaller than the predetermined difference αth.

Here, since the rack end position is predetermined for each EPS 1, the difference α assumes a smaller value when the first and second one end position-corresponding motor angles θma_x1, θma_x2 are set in the state where the rack shaft 12 is located at the rack end position. On the other hand, the motor absolute angle θma when the steered wheel 3 hits a curb differs according to the situation, so that the difference α assumes a larger value when the first and second one end position-corresponding motor angles θma_x1, θma_x2 are set in the state where the steered wheel 3 is hitting a curb. Therefore, the provisional end position-corresponding steered angle θma_xe is set when the difference α is equal to or smaller than the predetermined difference αth as in the present embodiment. This can reduce the likelihood that the provisional end position-corresponding steered angle θma_xe is set, for example, when the first one end position-corresponding motor angle θma_x1 is set in the state where the steered wheel 3 is hitting a curb.

Next, a third embodiment of the steering controller will be described in accordance with the drawings. The main difference between the present embodiment and the first embodiment is that, while in the first embodiment the end hitting impact mitigation control is executed by subtracting the current correction value Ira* from the basic current command value Ias*, in the present embodiment the same control is executed by executing a guard process on the basic current command value Ias*. For the convenience of description, the components that are the same as those in the first embodiment will be denoted by the same reference signs and description thereof will be omitted.

Figure 15:
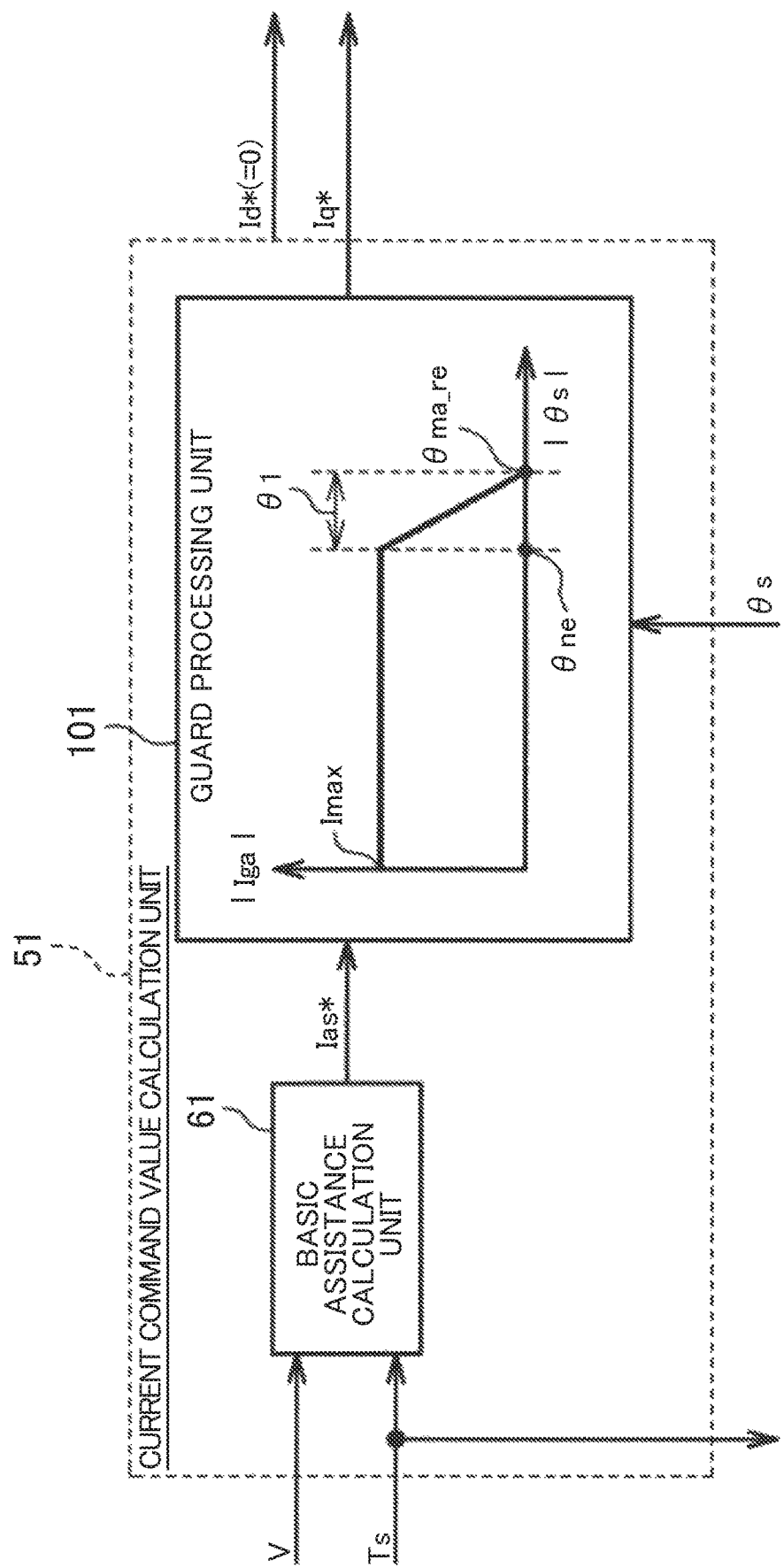
FIG. 15 is a block diagram of a current command value calculation unit of a third embodiment.

As shown in FIG. 15, the current command value calculation unit 51 of the present embodiment includes the basic assistance calculation unit 61 and a guard processing unit 101. The guard processing unit 101 limits the basic current command value Ias* based on the control steered angle θs. The current command value calculation unit 51 does not include the current correction value calculation unit 62 of the first embodiment.

The basic current command value Ias* output from the basic assistance calculation unit 61 and the control steered angle θs output from the control steered angle calculation unit 53 (see FIG. 2) are input into the guard processing unit 101. The guard processing unit 101 limits the absolute value of the basic current command value Ias* to or below a current limit value Iga, and outputs the basic current command value Ias* as the q-axis current command value Iq*. When the absolute value of the control steered angle θs exceeds that of the near-end steered angle θne, the guard processing unit 101 reduces the absolute value of the current limit value Iga based on the increase.

In particular, the guard processing unit 101 has a map as shown in FIG. 15, for example, and calculates the current limit value Iga according to the control steered angle θs based on this map. In this map, the current limit value Iga remains at a predetermined current value Imax until the absolute value of the control steered angle θs exceeds that of the near-end steered angle θne. The current limit value Iga is set such that, when the absolute value of the control steered angle θs becomes larger than the absolute value of the near-end steered angle θne, the absolute value of the current limit value Iga decreases as the absolute value of the control steered angle θs increases. The predetermined current value Imax is set to the maximum value of the basic current command value Ias* calculated by the basic assistance calculation unit 61, i.e., to such a value that the basic current command value Ias* is not limited.

The guard processing unit 101 calculates the current limit value Iga according to the control steered angle θs. When the absolute value of the input basic current command value Ias* is equal to or smaller than that of the current limit value Iga, the guard processing unit 101 outputs the value of the basic current command value Ias* as is as the q-axis current command value Iq*. On the other hand, when the absolute value of the input basic current command value Ias* is larger than that of the current limit value Iga, the guard processing unit 101 limits the value of the basic current command value Ias* to the value of the current limit value Iga and outputs the basic current command value Ias* as the q-axis current command value Iq*. When no control steered angle θs is output from the control steered angle calculation unit 53, the guard processing unit 101 outputs the value of the basic current command value Ias* as is as the q-axis current command value Iq*. Thus, when the absolute value of the control steered angle θs exceeds the absolute value of the near-end steered angle θne, the microcomputer 41 executes the end hitting impact mitigation control of reducing the absolute value of the q-axis current command value Iq*, which serves as the torque command value, based on the increase in the absolute value of the control steered angle θs.

As has been described above, the present embodiment can achieve operational effects similar to the operational effects (1) to (8) of the first embodiment. Next, a fourth embodiment of the steering controller will be described in accordance with the drawings. In the second embodiment, the provisional end hitting impact mitigation control is executed by subtracting the provisional current correction value Irb* from the basic current command value Ias*. On the other hand, in the fourth embodiment, the same control is executed by executing a provisional guard process on the basic current command value Ias*. This is the main difference between the fourth embodiment and the second embodiment. For the convenience of description, the components that are the same as those in the second embodiment will be denoted by the same reference signs and description thereof will be omitted.

Figure 16:
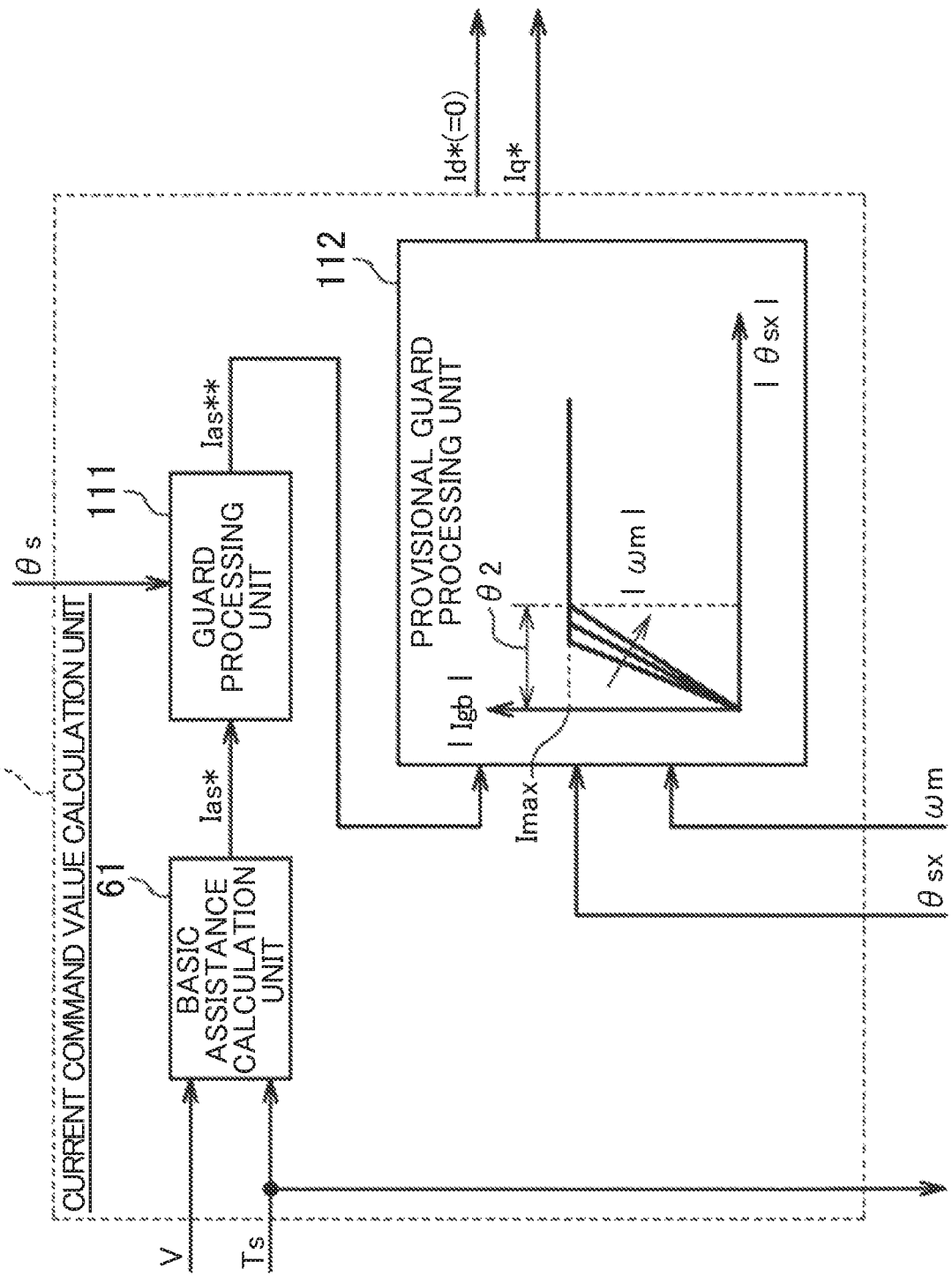
FIG. 16 is a block diagram of a current command value calculation unit of a fourth embodiment.

As shown in FIG. 16, the current command value calculation unit 51 of the present embodiment includes the basic assistance calculation unit 61, a guard processing unit 111, and a provisional guard processing unit 112. The guard processing unit 111 limits the basic current command value Ias* based on the control steered angle θs. The provisional guard processing unit 112 limits a basic current command value Ias** that has undergone the guard process, based on the provisional end separation angle θsx. The current command value calculation unit 51 does not include the current correction value calculation unit 62 and the provisional current correction value calculation unit 81 of the second embodiment.

The guard processing unit 111 has a configuration similar to that of the guard processing unit 101 of the third embodiment, and limits the basic current command value Ias* based on the control steered angle θs. The basic current command value Ias having undergone the guard process, the provisional end separation angle θsx output from the control steered angle calculation unit 53 (see FIG. 9), and the angular velocity ωm output from the angular velocity calculation unit 54 (see FIG. 9) are input into the provisional guard processing unit 112. The provisional guard processing unit 112 limits the absolute value of the basic current command value Ias having undergone the guard process to or below a provisional current limit value Igb, and outputs the basic current command value Ias** as the q-axis current command value Iq*. When the absolute value of the provisional end separation angle θsx becomes smaller than that of the second angle θ2, the provisional guard processing unit 112 reduces the absolute value of the provisional current limit value Igb based on the decrease.

In particular, the provisional guard processing unit 112 has a map as shown in FIG. 16, for example, and calculates the provisional current limit value Igb according to the provisional end separation angle θsx based on this map. In this map, the provisional current limit value Igb is set such that the absolute value of the provisional current limit value Igb decreases as the absolute value of the provisional end separation angle θsx becomes closer to zero. Moreover, the provisional current limit value Igb is set such that the provisional current limit value Igb remains at the predetermined current value Imax when the absolute value of the provisional end separation angle θsx becomes equal to or larger than the second angle θ2. Furthermore, the provisional current limit value Igb is set such that a range in which the provisional current limit value Igb remains at the predetermined current value Imax after the absolute value of the provisional end separation angle θsx becomes smaller than the second angle θ2 becomes wider as the absolute value of the angular velocity ωm becomes smaller.

The provisional guard processing unit 112 calculates the provisional current limit value Igb according to the provisional end separation angle θsx. When the absolute value of the input basic current command value Ias having undergone the guard process is equal to or smaller than that of the provisional current limit value Igb, the provisional guard processing unit 112 outputs the value of this basic current command value Ias as is as the q-axis current command value Iq*. On the other hand, when the absolute value of the input basic current command value Ias having undergone the guard process is larger than that of the provisional current limit value Igb, the provisional guard processing unit 112 limits the value of the basic current command value Ias to the value of the provisional current limit value Igb and outputs the basic current command value Ias** as the q-axis current command value Iq*. When no provisional end separation angle θsx is output from the control steered angle calculation unit 53, the provisional guard processing unit 112 outputs the value of the basic current command value Ias** having undergone the guard process as is as the q-axis current command value Iq*. Thus, when the provisional end separation angle θsx becomes smaller than the second angle θ2, the microcomputer 41 executes the provisional end hitting impact mitigation control of reducing the absolute value of the q-axis current command value Iq*, which serves as the torque command value, based on the decrease in the provisional end separation angle θsx.

As has been described above, the present embodiment can achieve operational effects similar to the operational effects (1) to (8) of the first embodiment and the operational effects (9) to (13) of the second embodiment. These embodiments can be implemented with the following modifications made thereto. The embodiments and the following modified examples can be implemented in combination with one another to such an extent that no technical inconsistency arises.

In the second and fourth embodiments, the first angle θ1 and the second angle θ2 may be set to different sizes from each other.

In the second embodiment, the provisional current correction value calculation unit 81 calculates the provisional current correction value Irb* based on the provisional end separation angle θsx output from the control steered angle calculation unit 53. However, the present invention is not limited to this example. For example, the motor absolute angle θma may be output from the control steered angle calculation unit 53, and the provisional current correction value Irb* may be calculated when the absolute value of the motor absolute angle θma exceeds the absolute value of the provisional near-end steered angle θnxe. Moreover, the end separation angle that is the difference between the end position-corresponding motor angle θma_re or θma_le and the control steered angle θs may be output from the control steered angle calculation unit 53 to the current correction value calculation unit 62, and the current correction value calculation unit 62 may calculate the current correction value Ira* based on this end separation angle. The configuration in which the current correction value Ira* is calculated based on the end separation angle is of course also applicable to the first embodiment.

In the second embodiment, the provisional current correction value calculation unit 81 calculates a larger provisional current correction value Irb* as the angular velocity ωm is higher. However, the present invention is not limited to this example. For example, the provisional current correction value Irb* may be calculated based only on the provisional end separation angle θsx, regardless of the angular velocity ωm. Moreover, the current correction value calculation unit 62 may calculate a larger current correction value Ira* as the angular velocity ωm is higher. The configuration in which the current correction value Ira* is calculated based on the angular velocity ωm is of course also applicable to the first embodiment.

In the fourth embodiment, the provisional guard processing unit 112 sets the provisional current limit value Igb such that the range in which the provisional current limit value Igb remains at the predetermined current value Imax after the absolute value of the provisional end separation angle θsx becomes smaller than the second angle θ2 becomes wider as the absolute value of the angular velocity ωm becomes smaller. However, the present invention is not limited to this example. For example, the provisional current limit value Igb may be calculated based only on the provisional end separation angle θsx, regardless of the angular velocity ωm. Moreover, the guard processing unit 101 may set the current limit value Iga such that the range in which the current limit value Iga remains at the predetermined current value Imax after the absolute value of the control steered angle θs exceeds the near-end steered angle θne becomes wider as the absolute value of the angular velocity ωm becomes smaller. The configuration in which the current limit value Iga is calculated based on the angular velocity ωm is of course also applicable to the third embodiment.

In the third and fourth embodiments, a compensation amount (e.g., a damping compensation amount) aimed at improving the feeling of steering etc. may be applied to the basic current command value Ias*. In this case, the guard process or the provisional guard process can be executed on the basic current command value Ias* after the compensation amount is applied to the command value.

In the second and fourth embodiments, even when the difference a between the first one end position-corresponding motor angle θma_x1 and the second one end position-corresponding motor angle θma_x2 is larger than the predetermined difference αth, the provisional end position-corresponding steered angle θma_xe may be set based on these motor angles.

In the second and fourth embodiments, the average value of the first and second one end position-corresponding motor angles θma_x1, θma_x2 is set as the provisional end position-corresponding steered angle θma_xe. However, the present invention is not limited to this example. For example, the first one end position-corresponding motor angle θma_x1 may be set as is as the provisional end position-corresponding steered angle θma_xe. Thus, the method of calculating the provisional end position-corresponding steered angle θma_xe can be changed appropriately.

In the second and fourth embodiments, the second one end position-corresponding motor angle θma_x2 may be set before the motor absolute angle θma changes by an amount equal to or larger than the predetermined steering amount θth indicating that the steering wheel has been turned back since the first one end position-corresponding motor angle θma_x1 is set.

In the second and fourth embodiments, the provisional end position-corresponding steered angle θma_xe may be calculated and at the same time set, and the provisional end hitting impact mitigation control may be executed before the motor absolute angle θma becomes by the second angle θ2 or larger closer to the steering neutral position than the provisional end position-corresponding steered angle θma_xe is.

In each of the above embodiments, the control steered angle calculation unit 53 sets the origin of the control steered angle θs based on whether the control flag indicating that the origin of the control steered angle θs should be set is on. However, the present invention is not limited to this example. For example, the origin of the control steered angle θs may be set with a predetermined operation performed by a user serving as a trigger, and the form of the trigger can be changed appropriately. The control flag may be set to turn on when, for example, the ignition is turned on or off a predetermined number of times or more, and the setting of the control flag can be changed appropriately.

In each of the above embodiments, the end position determination of whether the rack shaft 12 is located at the rack end position is made based on the angular velocity ωm of the motor 21 and the pinion shaft torque Tp. However, the present invention is not limited to this example. For example, the end position determination may be made based only on the pinion shaft torque Tp. Alternatively, for example, the end position determination may be made using an angular acceleration of the motor 21. In this case, the angular acceleration of the motor 21 can be used instead of the angular velocity ωm, for example. Moreover, a contact sensor may be provided on the rack end 18, and the end position determination may be made based on a signal from this sensor. Thus, the form of determination can be changed appropriately.

In each of the above embodiments, the origin of the control steered angle θs may be set based on the right and left end position-corresponding motor angles θma_re, θma_le immediately after these motor angles are set.

In each of the above embodiments, it is determined whether the stroke width Wma is smaller than the stroke threshold value Wth. However, the origin of the control steered angle θs may be set without it being determined whether the stroke width Wma is smaller than the stroke threshold value Wth.

In each of the above embodiments, the average value of the right and left end position-corresponding motor angles θma_re, θma_le is set as the offset angle Δθ, and the angle obtained by subtracting the offset angle Δθ from the motor absolute angle θma is set as the origin of the control steered angle θs corresponding to the steering neutral position. However, the present invention is not limited to this example, and the method of calculating the origin of the control steered angle θs corresponding to the steering neutral position can be changed appropriately.

In each of the above embodiments, once the end position-corresponding motor angles θma_re, θma_le are set, these end position-corresponding motor angles θma_re, θma_le may be left unrenewed even when a motor absolute angle θma having the same sign as and a larger absolute value than the end position-corresponding motor angle θma_re or θma_le is detected thereafter.

In each of the above embodiments, rotation of the motor 21 due to elastic deformation is calculated by multiplying the elastic modulus K of the steering mechanism 4 by the pinion shaft torque Tp (K×Tp), and a value obtained by subtracting this rotation from the raw motor absolute angle is detected as the motor absolute angle θma. However, the present invention is not limited to this example. A component other than the pinion shaft torque Tp, for example, the angular acceleration of the motor 21 may be taken into account in estimating rotation of the motor 21 due to elastic deformation, and a value obtained by subtracting this estimated rotation from the raw motor absolute angle may be detected as the motor absolute angle θma.

In each of the above embodiments, the motor absolute angle calculation unit 71 acquires the motor absolute angle θma as an angle corrected based on mechanical elastic deformation of the steering mechanism 4 caused by the pinion shaft torque Tp applied thereto. However, the present invention is not limited to this example, and the motor absolute angle θma need not be corrected based on mechanical elastic deformation.

In each of the above embodiments, the end hitting impact mitigation control is executed based on the control steered angle θs represented by the motor absolute angle θma having the origin at the steering neutral position. However, the present invention is not limited to this example. For example, the origin of the control steered angle θs may be located at either one of the right and left rack end position, and thus the origin can be changed appropriately.

In each of the above embodiments, the end hitting impact mitigation control is executed based on the control steered angle θs. However, the present invention is not limited to this example. For example, control of assisting the steering wheel 2 so as to smoothly turn back to the steering neutral position may be executed based on the control steered angle θs during turning back of the steering wheel 2. Thus, various modes of control can be executed based on the control steered angle θs.

In each of the above embodiments, the steering controller 6 is intended to control the EPS 1 of the type in which the EPS actuator 5 applies the motor torque Tm to the column shaft 14. However, the present invention is not limited to this example. For example, the steering controller 6 may be intended to control a steering system of a type in which the motor torque Tm is applied to the rack shaft 12 through a ball screw nut. Moreover, the steering controller 6 may be intended to control, other than an EPS, a steer-by-wire steering system in which an operation unit operated by a driver and a steering unit that steers steered wheels are mechanically separated from each other, and the steering controller 6 may calculate a control steered angle based on a rotation angle of a motor of a steering actuator provided in the steering unit.

Next, the technical concept that can be understood from the above embodiments and other examples will be additionally described below along with the effects of these embodiments and examples.

The steering mechanism transmits rotation of the steering shaft, which is composed of the column shaft, the intermediate shaft, and the pinion shaft coupled together, by converting the rotation into reciprocation of the rack shaft serving as the steering axle through the rack-and-pinion mechanism. The actuator applies the motor torque of the motor to the column shaft. In the steering controller of the above configuration, the motor torque is transmitted to the steered wheels through the column shaft, the intermediate shaft, the pinion shaft, the rack shaft, etc. Thus, the steering mechanism tends to undergo significant elastic deformation due to not only compression of the rack shaft but also a torque applied thereto, such as torsion of the intermediate shaft. It is therefore significantly effective to set the motor absolute angle that is corrected based on elastic deformation occurring in the steering mechanism as the end position-corresponding motor angle.

According to the present invention, an accurate motor absolute angle corresponding to an actual steered angle can be acquired.

What is claimed is:
1. A steering controller intended to control a steering system in which an actuator having a motor as a driving source applies a motor torque to a steering axle of a steering mechanism to reciprocate the steering axle, the steering controller comprising:
   an end position determination unit that determines whether the steering axle is located at either one of right and left end positions;
   a motor absolute angle detection unit that detects a rotation angle of the motor as an absolute angle exceeding a range of 360 degrees; and
   an end position-corresponding motor angle setting unit that, when the end position determination unit determines that the steering axle is located at either one of the right and left end positions, sets a motor absolute angle detected by the motor absolute angle detection unit as an end position-corresponding motor angle corresponding to the one of the right and left end positions, wherein
   when the motor absolute angle detection unit detects the motor absolute angle having the same sign as, and a larger absolute value than, the end position-corresponding motor angle after the end position-corresponding motor angle setting unit sets the end position-corresponding motor angle, the end position-corresponding motor angle setting unit sets the motor absolute angle as a new end position-corresponding motor angle.

2. The steering controller according to claim 1, wherein the motor absolute angle detection unit detects the motor absolute angle after correcting this motor absolute angle based on mechanical elastic deformation of the steering mechanism caused by a torque applied to the steering mechanism.

3. The steering controller according to claim 1, further comprising a control steered angle origin setting unit that calculates, as an offset angle, an average value of the right and left end position-corresponding motor angles set by the end position-corresponding motor angle setting unit, and sets an angle obtained by subtracting the offset angle from the detected motor absolute angle as an origin of a control steered angle represented by the motor absolute angle.

4. The steering controller according to claim 3, wherein the control steered angle origin setting unit does not set the origin when a sum of absolute values of the right and left end position-corresponding motor angles set by the end position-corresponding motor angle setting unit is smaller than a stroke threshold value that is based on a motor absolute angle range corresponding to a full stroke range of the steering axle.

5. The steering controller according to claim 3, further comprising a motor control unit that controls driving of the motor such that the motor torque meets a torque command value, wherein:
   when an absolute value of the control steered angle exceeds an absolute value of a near-end steered angle that is by a first angle closer to a steering neutral position than the end position-corresponding motor angle is, the motor control unit executes end hitting impact mitigation control of reducing an absolute value of the torque command value based on an increase in the absolute value of the control steered angle;
   when the right and left end position-corresponding motor angles are set, the control steered angle origin setting unit sets the origin based on these right and left end position-corresponding motor angles after the motor absolute angle becomes by the first angle or larger closer to the steering neutral position than these right and left end position-corresponding motor angles are; and the motor control unit executes the end hitting impact mitigation control after the origin is set.

6. The steering controller according to claim 3, further comprising a motor control unit that controls driving of the motor such that the motor torque meets a torque command value, wherein:
when an absolute value of the control steered angle exceeds a near-end steered angle that is by a first angle closer to a steering neutral position than the end position-corresponding motor angle is, the motor control unit executes end hitting impact mitigation control of reducing an absolute value of the torque command value based on an increase in the absolute value of the control steered angle;
the steering controller further comprises a provisional end position-corresponding steered angle setting unit that, in a state where the origin of the control steered angle is not set, based on a plurality of one end position-corresponding motor angles that is the motor absolute angles detected at a plurality of timings at which the end position determination unit determines that the steering axle is located at either one of the right and left end positions, sets a provisional end position-corresponding steered angle corresponding to the one of the right and left end positions; and
when an angle from the motor absolute angle to the provisional end position-corresponding steered angle becomes smaller than a second angle, the motor control unit executes provisional end hitting impact mitigation control of reducing an absolute value of the torque command value based on a decrease in the angle.

7. The steering controller according to claim 6, wherein:
when the plurality of one end position-corresponding motor angles is set, the provisional end position-corresponding steered angle setting unit sets the provisional end position-corresponding steered angle based on these one end position-corresponding motor angles after the motor absolute angle becomes by the second angle or larger closer to the steering neutral position than the provisional end position-corresponding steered angle is; and
the motor control unit executes the provisional end hitting impact mitigation control after the provisional end position-corresponding steered angle is set.

8. The steering controller according to claim 6, wherein the provisional end position-corresponding steered angle setting unit sets an average value of the plurality of one end position-corresponding motor angles as the provisional end position-corresponding steered angle.

9. The steering controller according to claim 6, wherein the provisional end position-corresponding steered angle setting unit uses, as the plurality of one end position-corresponding motor angles serving as a basis for the provisional end position-corresponding steered angle, one of the plurality of one end position-corresponding motor angles, and another of the plurality of one end position-corresponding motor angles that is set after the motor absolute angle changes by an amount equal to or larger than a predetermined steering amount indicating that a steering wheel has been turned back since the one of the plurality of one end position-corresponding motor angles is set.

10. The steering controller according to claim 6, wherein the provisional end position-corresponding steered angle setting unit sets the provisional end position-corresponding steered angle when a difference between one and another of the plurality of one end position-corresponding motor angles is equal to or smaller than a predetermined difference.

11. The steering controller according to claim 1, wherein, when an angular velocity of the motor is equal to or lower than a predetermined angular velocity that indicates a stopped state of the motor, and a torque applied to the steering mechanism is equal to or larger than a predetermined torque, the end position determination unit determines that the steering axle is located at an end position.

* * * * *